US012261344B2

(12) United States Patent
Hill et al.

(10) Patent No.: US 12,261,344 B2
(45) Date of Patent: Mar. 25, 2025

(54) HIGH SATURATION MAGNETIZATION AND HIGH DIELECTRIC CONSTANT FERRITES

(71) Applicant: Skyworks Solutions, Inc., Irvine, CA (US)

(72) Inventors: Michael David Hill, Emmitsburg, MD (US); David Bowie Cruickshank, Rockville, MD (US); Iain Alexander Macfarlane, Insch (GB); Srinivas Polisetty, Frederick, MD (US); James Gerard O'Callaghan, Cork (IE); Scott David Wilson, Cork (IE)

(73) Assignee: Skyworks Solutions, Inc., Irvine, CA (US)

( * ) Notice: Subject to any disclaimer, the term of this patent is extended or adjusted under 35 U.S.C. 154(b) by 244 days.

(21) Appl. No.: 17/936,795

(22) Filed: Sep. 29, 2022

(65) Prior Publication Data
US 2023/0096130 A1 Mar. 30, 2023

Related U.S. Application Data

(60) Provisional application No. 63/263,151, filed on Oct. 27, 2021, provisional application No. 63/250,888, filed on Sep. 30, 2021.

(51) Int. Cl.
H01P 1/387 (2006.01)
C04B 35/26 (2006.01)
C04B 35/505 (2006.01)
H01F 1/34 (2006.01)
H01F 1/44 (2006.01)

(52) U.S. Cl.
CPC .......... *H01P 1/387* (2013.01); *C04B 35/2675* (2013.01); *C04B 35/505* (2013.01); *H01F 1/344* (2013.01); *C04B 2235/3274* (2013.01); *C04B 2235/764* (2013.01); *C04B 2235/94* (2013.01); *C04B 2235/96* (2013.01)

(58) Field of Classification Search
CPC ....... H01P 1/387; H01F 1/344; C04B 35/2675
USPC .................. 333/1.1, 185, 204, 205
See application file for complete search history.

(56) References Cited

U.S. PATENT DOCUMENTS

| 5,434,101 A * | 7/1995 | Yamasawa ............... C30B 19/02 117/89 |
| 8,696,925 B2 | 4/2014 | Cruickshank et al. |
| 9,263,175 B2 | 2/2016 | Cruickshank et al. |
| 9,771,304 B2 | 9/2017 | Cruickshank et al. |
| 10,370,299 B2 | 8/2019 | Cruickshank et al. |
| 11,021,400 B2 | 6/2021 | Cruickshank et al. |
| 2023/0102155 A1 | 3/2023 | Hill et al. |

* cited by examiner

*Primary Examiner* — Rakesh B Patel
(74) *Attorney, Agent, or Firm* — Knobbe, Martens, Olson & Bear, LLP

(57) ABSTRACT

The disclosed technology relates to a ceramic composition and an article formed therefrom. A ceramic article for radio frequency applications is formed of a ceramic material having a chemical formula represented by: $Bi_{1.0+a}Y_{2.0-a-x-2y}Ca_{x+2y}Fe_{5-x-y}M^{IV}_xV_yO_{12}$ or $Bi_{1.0+a}Y_{2.0-a-2y}Ca_{2y}Fe_{5-y-z}V_yIn_zO_{12}$. The ceramic material has a composition such that a normalized change in saturation magnetization ($\Delta 4\pi Ms$), defined as $\Delta 4\pi Ms=[(4\pi Ms$ at $20°$ C.$)-(4\pi Ms$ at $120°$ C.$)]/(4\pi Ms$ at $20°$ C.$)$, is less than about 0.35.

20 Claims, 32 Drawing Sheets

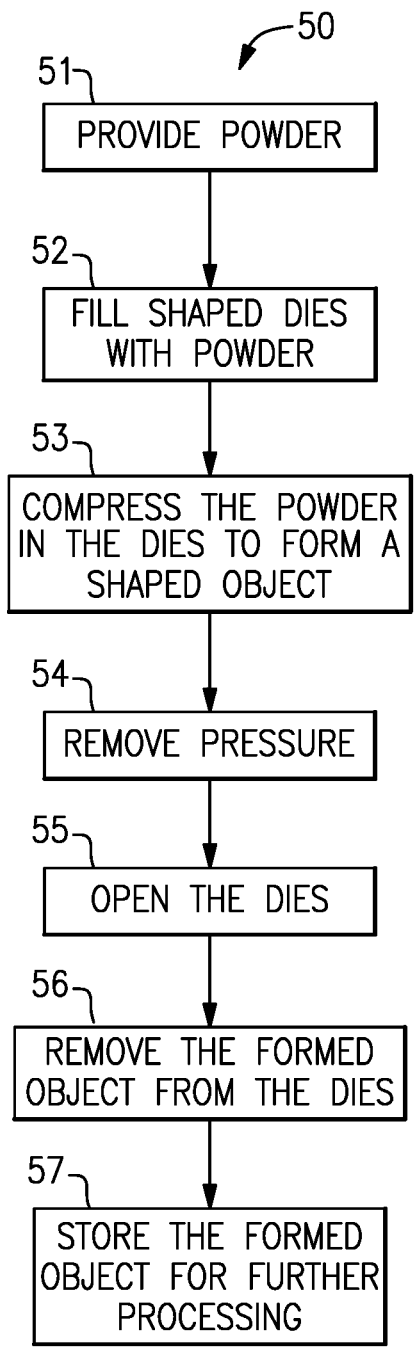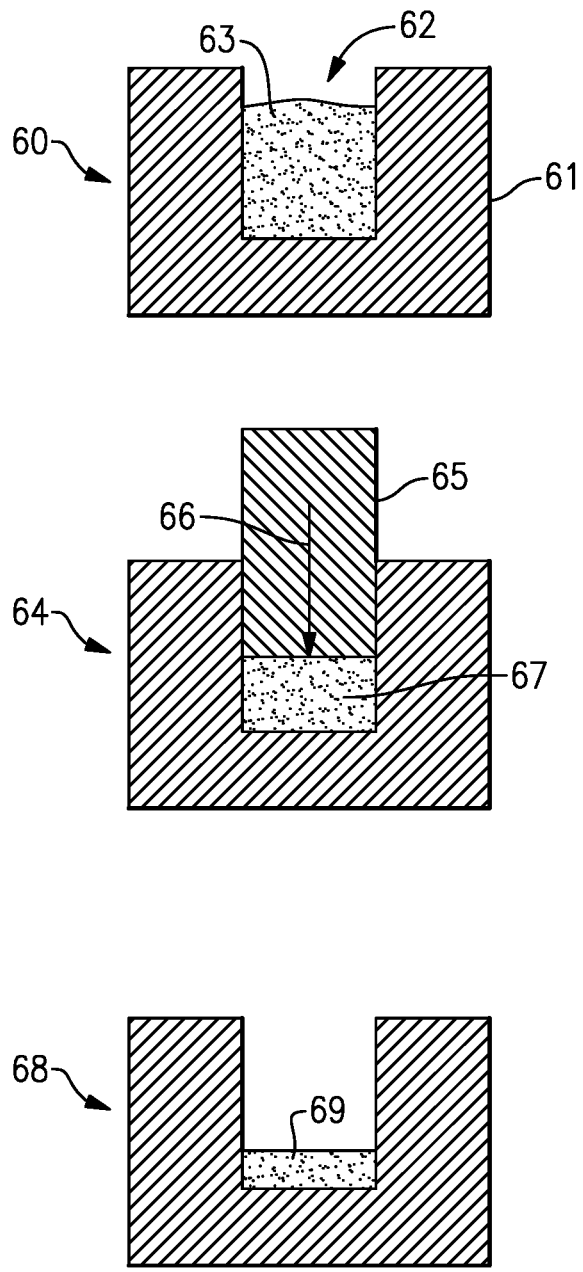
FIG. 18
FIG. 19

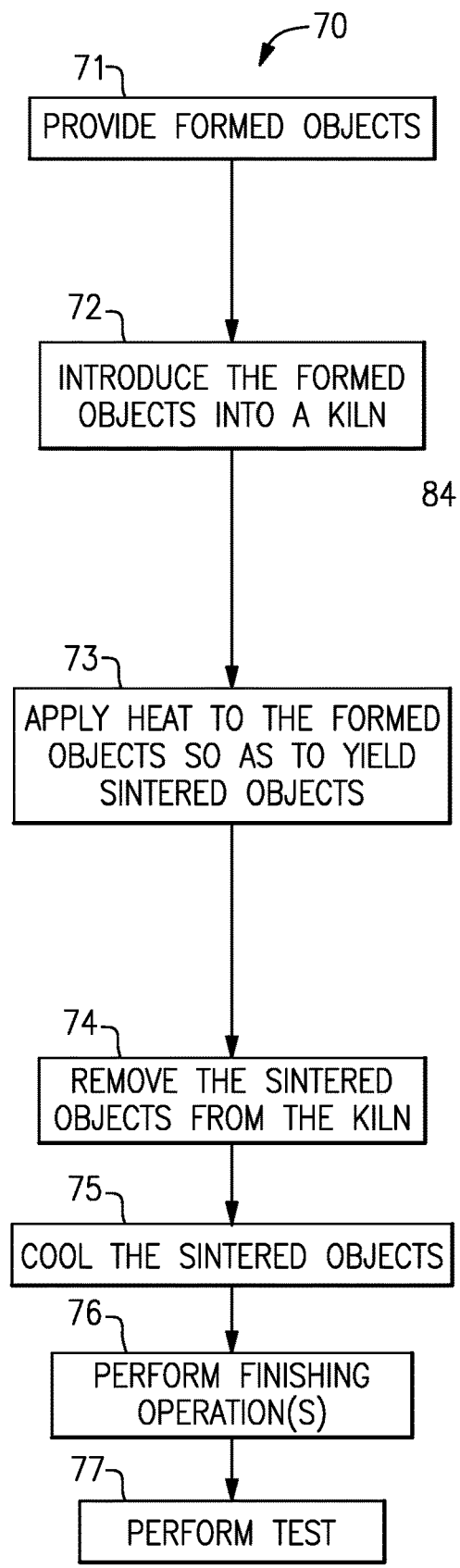

HIGH SATURATION MAGNETIZATION AND HIGH DIELECTRIC CONSTANT FERRITES

CROSS-REFERENCE TO RELATED APPLICATION

This application claims the benefit of U.S. Provisional Application No. 63/250,888, entitled "HIGH SATURATION MAGNETIZATION AND HIGH DIELECTRIC CONSTANT FERRITES," filed Sep. 30, 2021, and U.S. Provisional Application No. 63/263,151, entitled "HIGH SATURATION MAGNETIZATION AND HIGH DIELECTRIC CONSTANT FERRITES CONTAINING INDIUM," filed Oct. 27, 2021. The content of each of the above applications is hereby incorporated by reference in its entirety.

BACKGROUND

Field

The present disclosure generally relates to modified garnets having an ultra-high dielectric constant, and applications of such modified garnets.

Description of the Related Art

Various crystalline materials with magnetic properties have been used as components in electronic devices such as cellular phones, biomedical devices, and RFID sensors. Garnets are crystalline materials with ferrimagnetic properties particularly useful in RF electronics operating in the lower frequency portions of the microwave region. Many microwave magnetic materials are derivatives of yttrium iron garnet (YIG), a synthetic form of garnet widely used in various telecommunication devices largely because of its favorable magnetic properties such as narrow linewidth at its ferromagnetic resonance frequency. YIG is generally composed of yttrium, iron, and oxygen, and is possibly doped with one or more other rare earth metals such as lanthanides or scandium.

SUMMARY

In one aspect, a ceramic article for radio frequency applications is formed of a ceramic material having a chemical formula represented by $Bi_{1.0+a}Y_{2.0-a-x-2y}Ca_{x+2y}Fe_{5-x-y}M^{IV}_xV_yO_{12}$, wherein $M^{IV}$=Zr, Sn or Ti, $0<x\leq0.5$, $0\leq y\leq0.25$, and $0\leq a\leq0.5$.

In another aspect, a ceramic article for radio frequency applications is formed of a ceramic material having a chemical formula represented by $Bi_{1.0+a}Y_{2.0-a-x-2y}Ca_{x+2y}Fe_{5-x-y}M^{IV}_xV_yO_{12}$, wherein $M^{IV}$=Zr, Sn or Ti, and wherein the ceramic material has a composition such that a normalized change in saturation magnetization ($\alpha 4\pi Ms$), defined as $\Delta 4\pi Ms=[(4\pi Ms$ at 20° C.$)-(4\pi Ms$ at 120° C.$)]/(4\pi Ms$ at 20° C.$)$, is less than 0.35.

In another aspect, a radio frequency (RF) circulator comprises a ceramic disk formed of a ceramic material having a chemical formula represented by $Bi_{1.0+a}Y_{2.0-a-x-2y}Ca_{x+2y}Fe_{5-x-y}M^{IV}_xV_yO_{12}$, being Zr, Sn or Ti, and the ceramic material has a composition such that a normalized change ($\Delta 4\pi Ms$) in saturation magnetization (Ms), defined as $\Delta 4\pi Ms=[(4\pi Ms$ at 20° C.$)-(4\pi Ms$ at 120° C.$)]/(4\pi Ms$ at 20° C.$)$, is less than about 0.35.

In another aspect, a ceramic article for radio frequency applications is formed of a ceramic material having a chemical formula represented by $Bi_{1.0+a}Y_{2.0-a-2y}Ca_{2y}Fe_{5-y-z}V_yIn_zO_{12}$, wherein $0<z\leq0.5$, $0\leq y\leq0.25$, and $0\leq a\leq0.5$.

In another aspect, a ceramic article for radio frequency applications is formed of a ceramic material having a chemical formula represented by $Bi_{1.0+a}Y_{2.0-a-2y}Ca_{2y}Fe_{5-y-z}V_yIn_zO_{12}$, wherein the ceramic material has a composition such that a normalized change in magnetization ($\Delta 4\pi Ms$), defined as $\Delta 4\pi Ms=[(4\pi Ms$ at 20° C.$)-(4\pi Ms$ at 120° C.$)]/(4\pi Ms$ at 20° C.$)$, is less than 0.35.

In another aspect, a radio frequency (RF) circulator comprises a ceramic disk formed of a ceramic material a ceramic disk formed of a ceramic material having a chemical formula represented by $Bi_{1.0+a}Y_{2.0-a-2y}Ca_{2y}Fe_{5-y-z}V_yIn_zO_{12}$, wherein the ceramic material has a composition such that a normalized change in magnetization ($\Delta 4\pi Ms$), defined as $\Delta 4\pi Ms=[(4\pi Ms$ at 20° C.$)-(4\pi Ms$ at 120° C.$)]/(4\pi Ms$ at 20° C.$)$, is less than about 0.35.

BRIEF DESCRIPTION OF THE DRAWINGS

FIG. 18 shows a process that can be implemented to form a shaped object from powder material described herein.

FIG. 19 shows examples of various stages of the process of FIG. 18.

FIG. 20 shows a process that can be implemented to sinter formed objects such as those formed in the example of FIGS. 18 and 19.

FIG. 21 shows examples of various stages of the process of FIG. 19.

DETAILED DESCRIPTION

Figure 1:
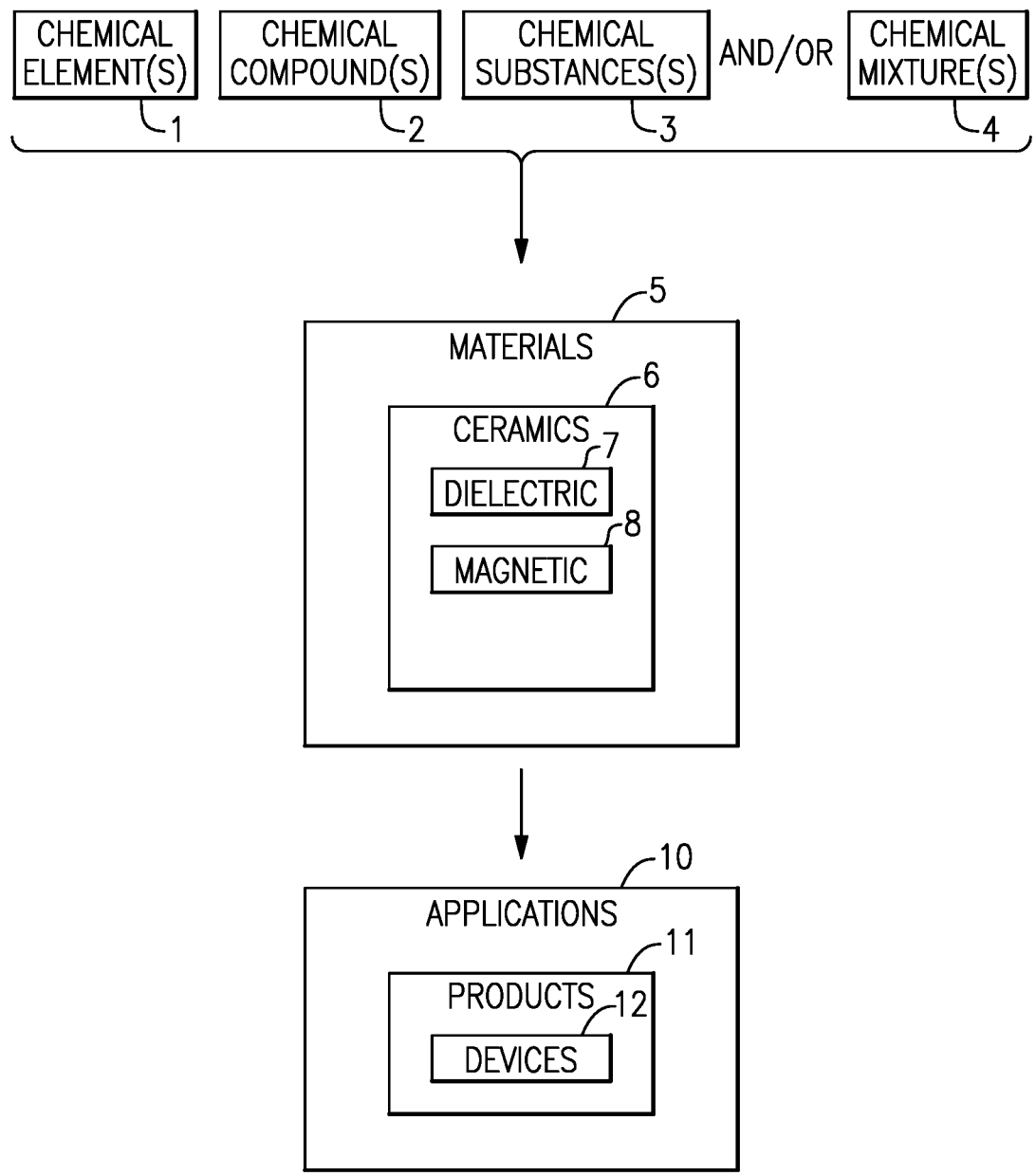
FIG. 1 schematically shows how materials having one or more features described herein can be designed, fabricated, and used.

Various synthetic garnets (or generally ferrites/ferrite garnets) enable size reduction of RF components such as isolators and circulators, in part due to their high (e.g., >28) dielectric constants. This is because the size of the isolators and circulators can generally be scaled in proportion to an inverse of the square root of the dielectric constant. Some existing solutions using high dielectric constant ferrites as the basis for reduced size above-resonance circulators employ ferrites with saturation magnetizations close to 2000 Gauss and a Curie Temperatures close to 280° C. These materials offer various advantages in intermodulation performance as well as high fractional bandwidths. However, some of the existing materials suffer the drawback of high insertion losses, which can be due to high 3 dB linewidth and loss tangent of the ferrite. Intermodulation can be a measure of the influence of the sums and differences of adjacent frequencies generated by the non-linear response of the isolator or circulator having a ceramic disk formed of, e.g., a synthetic garnet such as a ferrite. The material composition of the ceramic material used to form the isolator and circulator can limit the intermodulation performance through different mechanisms. First, if the 3 dB linewidth is too broad, e.g., >about 40 Oersted in a wideband device, substantial physical absorption of the RF energy may occur, and intermodulation can cause adjacent channel noise in multi-channel systems. In addition, if the outer diameter of the disk is too close to the magnetic body of the RF device, which carries a "return path" in the opposite direction to the applied magnetic field, the edge of the disk can become magnetically unsaturated and show a non-linear behavior in an RF field, thereby also creating intermodulation products, depending on the distance of the disk is from the body, the magnitude of the applied field and frequency (wavelength). It will be appreciated that a reduction in the physical size of the disk can be achieved by increasing the dielectric constant because the disk having a high dielectric constant electrically behaves in the same way as a larger disk having a lower dielectric constant, thereby effectively increasing the distance to the body. Thus, the synthetic garnet material should have a high dielectric constant (>25). In addition to having a relatively low 3 dB linewidth and a relatively high dielectric constant, the synthetic should also meet various other parameters, including saturation magnetization (Ms) and $4\pi\Delta Ms/\Delta T$ to meet the device bandwidth, temperature behavior, intermodulation and insertion loss constraints. In addition, some of the existing material may need to be assembled either through gluing or co-firing with a non-magnetic dielectric ring. Such manufacturing processes add to the cost of the device. Thus, there is need for a material which has a high enough dielectric constant to enable device miniaturization of the isolators or circulators, while improving the intermodulation performance with lower 3 dB linewidths and loss tangents to reduce insertion loss.

To address these and other needs, synthetic garnet compositions according to one aspect include a ferrite comprising Bi, Y, Ca, $M^{IV}$ and V, where $M^{IV}$ is one of Zr, Sn or Ti. Garnet compositions according to another aspect include a ferrite comprising Bi, Y, Ca, In and V. The inventors have discovered that the $M^{IV}$ in ferrites according to some embodiments can have similar effects as V in ferrites according to some other embodiments, when the corresponding amounts thereof are adjusted to balance the overall charge in the ferrites. The ferrites according to various embodiments have a composition such that a normalized change in saturation magnetization ($\Delta 4\pi Ms$), defined as $\Delta 4\pi Ms=[(4\pi Ms$ at 20° C.)−(4πMs at 120° C.)]/(4πMs at 20° C.), is less than about 0.35.

The ferrites according to embodiments provide 3 dB linewidths (e.g., <50 Oe) and loss tangents (e.g., lower than 001) that are considerably lower than some of existing ferrites. As a result, isolators and circulators formed of ferrites according to embodiments have low insertion loss. In addition, the ferrites according to embodiments enable miniaturization due to the relatively high dielectric constant of the ferrite, which in turn allows for a small ferrite disk to be disposed far enough away from the circulator walls such that a dielectric ring may not be present. The use of single disk ferrites rather than assemblies for above resonance circulators in turn reduces the bill of materials. In addition, it improves the performance by removing the need for lossy adhesives needed to attach the ferrite to the dielectric ring.

FIG. 1 schematically shows how one or more chemical elements (block 1), chemical compounds (block 2), chemical substances (block 3) and/or chemical mixtures (block 4) can be processed to yield one or more materials (block 5) having one or more features described herein. In some embodiments, such materials can be formed into ceramic materials (block 6) configured to include a desirable dielectric property (block 7), a magnetic property (block 8) and/or an advanced material property (block 9).

In some embodiments, a material having one or more of the foregoing properties can be implemented in applications (block 10) such as radio-frequency (RF) application. Such applications can include implementations of one or more features as described herein in devices 12. In some applications, such devices can further be implemented in products 11. Examples of such devices and/or products are described herein.

Microstrip Circulators/Isolators

Circulators are passive multiport devices which can receive and transmit different signals, such as microwave or radiofrequency (RF). These ports can be an external waveguide or transmission line which connects to and from the circulator. Isolators are similar to circulators, but one or more of the ports can be blocked off. Hence, circulator and isolator can be used interchangeably herein as they can be similar in general structural. Thus, all discussion below can apply both to circulators and isolators.

Microstrip circulators and isolators are devices known in the art and include a thin film circuit deposited over a substrate, such as a dielectric ferrite substrate. In some embodiments, one or more ferrite discs can be adhered onto the substrate. Magnet(s) can then be further attached to circulate a signal through the ferrite disc.

Further, all-ferrite microstrip circulators have been used as well, in particular for radar T/R modules. Circuitry can be printed onto the all-ferrite microstrip circulator and a magnet can be added on top to direct the signal. For example, a metallization pattern is formed onto a ferrite substrate. Typically, the metallization pattern can include a central disc and multiple transmission lines.

Figure 2:
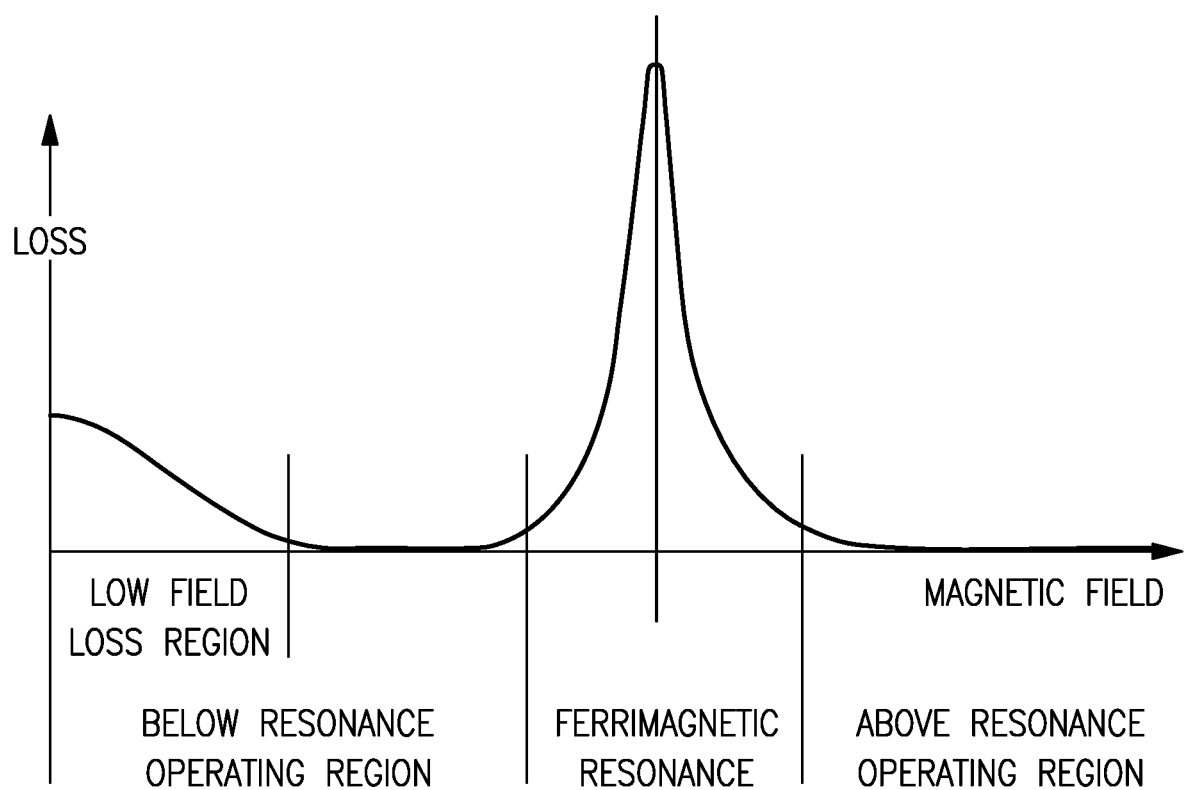
FIG. 2 illustrates a magnetic field v. loss chart.

Circulators generally can operate in either of the above or below resonance operating regions. This is shown in FIG. 2. In some embodiments, above-resonance frequencies can be advantageous for narrow band, sub 4 GHz circulators. For higher frequencies, the below resonance region can be more advantageous.

Microstrip circulators in particular typically work in the below resonance operating region. They use a very small magnet or can be self-biased, such as in the case of hexagonal ferrites. However, square tiles can be a difficult shape to magnetize uniformly, in particular for the all-ferrite microstrip circulators known in the art. Thus, they will operate close to the low field loss region. When transformers are mounted on the lossy unmagnetized ferrite, performance suffers. Further, increased power will make the poor performance even more known. Thus, circulators known in the art suffer from issues due to the ferrite tile being poorly magnetized, leading to poor insertion loss and intermodulation distortion (IMD), and power performance.

Synthetic Garnets

To address the various needs for isolators and circulators disclosed herein including low insertion loss, disclosed herein are embodiments of synthetic garnet compositions including yttrium iron garnet (YIG), and articles manufactured therefrom for RF applications, such as isolators and circulators. The garnet compositions according to embodiments provide 3 dB linewidths and loss tangents that are considerably lower than some of existing ferrites. As a result, isolators and circulators formed of ferrites according to embodiments have low insertion loss. In particular, garnet compositions according to one aspect includes a ferrite comprising Bi, Y, Ca, $M^{IV}$ and V, where $M^{IV}$ is one of Zr, Sn or Ti. Garnet compositions according to another aspect includes a ferrite comprising Bi, Y, Ca, In and V. The ferrites according to embodiments have a composition such that a normalized change in saturation magnetization ($\Delta 4\pi Ms$), defined as $\Delta 4\pi Ms=[(4\pi Ms$ at 20° C.)−(4πMs at 120° C.)]/ (4πMs at 20° C.), is less than 0.35.

The inventors have discovered that the $M^{IV}$ in $M^{IV}$-containing ferrites according to some embodiments described herein can have similar technical effects in the overall characteristics of the ferrites as In in In-containing ferrites according to some other embodiments described herein, when the corresponding amounts of the $M^{IV}$ and In are adjusted to balance the overall charge in the ferrites according to the respective chemical compositions described herein.

Figure 3:
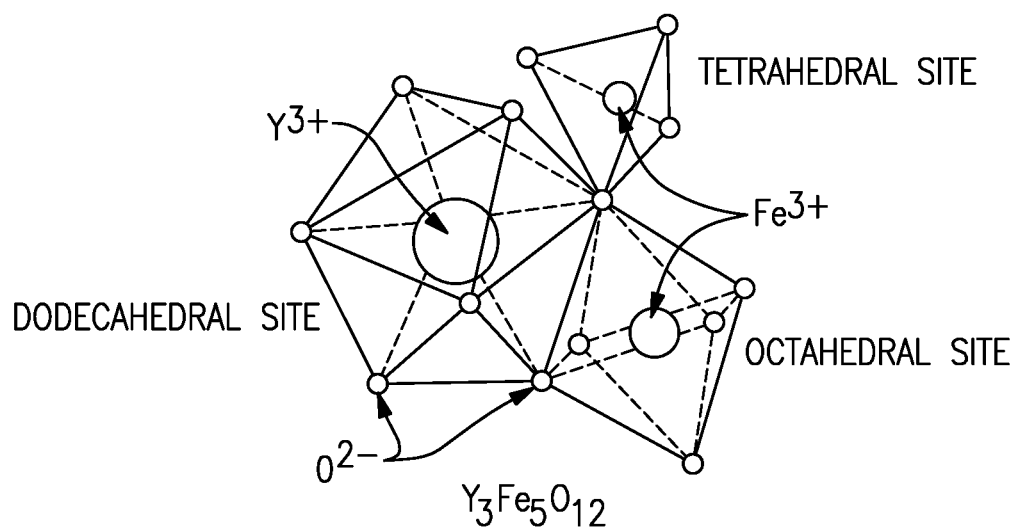
FIG. 3 depicts an yttrium-based garnet crystal lattice structure.

Synthetic garnets typically have the formula unit of $A_3B_5O_{12}$, where A and B are trivalent metal ions. yttrium iron garnet (YIG) is a synthetic garnet having the formula unit of $Y_3Fe_5O_{12}$, which includes yttrium (Y) in the 3+ oxidation state and Iron (Fe) in the 3+ oxidation state. The general crystal structure of a YIG formula unit is depicted in FIG. 3. As shown in FIG. 3, YIG has a dodecahederal site, an octahedral site, and a tetrahedral site. The Y ions occupy the dodecahedral site while the Fe ions occupy the octahedral and tetrahedral sites. Each YIG unit cell, which is cubic in crystal classifications, has eight of these formula units.

The modified synthetic garnet compositions, in some embodiments, involve substituting some or all of the yttrium (Y) in the yttrium iron garnet (YIG) with one or a combination of other ions such that the resulting material maintains or increases desirable magnetic properties for microwave (or other) applications, for example high dielectric constants. There have been past attempts toward doping YIG with different ions to modify the material properties. Some of these attempts, such as bismuth (Bi)-doped YIG, are described in "Microwave Materials for Wireless Applications" by D. B. Cruickshank, which is hereby incorporated by reference in its entirety. However, in practice ions used as substitutes may not behave predictably because of, for example, spin canting induced by the magnetic ion itself or by the effect of non-magnetic ions on the environment adjacent magnetic ions, reducing the degree alignment. Thus, the resulting magnetic properties are very difficult to be predicted. Additionally, the amount of substitution is limited in some cases. Beyond a certain limit, the ion will may not enter its preferred lattice site and may either remain on the outside in a second phase compound or leak into another site. Additionally, ion size and crystallographic orientation preferences may compete at high substitution levels, or substituting ions are influenced by the ion size and coordination of ions on other sites. As such, the assumption that the net magnetic behavior is the sum of independent sub-lattices or single ion anisotropy may not always apply in predicting magnetic properties.

Considerations in selecting a suitable YIG for microwave magnetic applications include the optimization of the density, the magnetic resonance linewidth, the saturation magnetization, the Curie temperature, the dielectric constant of the material, and the dielectric loss tangent in the resulting modified crystal structure. Magnetic resonance is derived from spinning electrons, which when excited by an appropriate radio frequency (RF) will show resonance proportional to an applied magnetic field and the frequency. The width of the resonance peak is usually defined at the half power points and is referred to as the magnetic resonance linewidth. It is generally advantageous for the material to have a low linewidth because low linewidth manifests itself as low magnetic loss, which is required for all low insertion loss ferrite devices. The modified garnet compositions according to preferred embodiments of the present invention provide single crystal or polycrystalline materials with reduced yttrium content and yet maintaining low linewidth and other desirable properties for microwave magnetic applications.

In some embodiments, an yttrium-based garnet is modified by substituting bismuth ($Bi^{3+}$) for some of the yttrium ($Y^{3+}$) on the dodecahedral sites of the garnet structure in combination with introducing one or more ions, such as divalent (+2), trivalent (+3), tetravalent (+4), pentavalent (+5) or hexavalent (+6) non-magnetic ions to the octahedral sites of the structure to replace at least some of the iron ($Fe^{3+}$). In some embodiments disclosed herein, one or more non-magnetic tetravalent ions such as zirconium ($Zr^{4+}$), tin ($Sn^{4+}$) or titanium ($Ti^{4+}$) can be introduced to the octahedral sites to replace the iron. Alternatively, one or more non-magnetic trivalent ions such as indium ($In^{3+}$) can be introduced to the octahedral sites to replace the iron.

In some embodiments, an yttrium-based garnet is modified by introducing one or more high valency ions with an oxidation state greater than 3+ to the octahedral or tetrahedral sites of the garnet structure in combination with substituting calcium ($Ca^{2+}$) for yttrium ($Y^{3+}$) in the dodecahedral site of the structure for charge compensation induced by the high valency ions, hence reducing the $Y^{3+}$ content. When non-trivalent ions are introduced, valency balance is maintained by introducing, for example, divalent calcium ($Ca^{2+}$) to balance the non-trivalent ions. For example, for each 4+ ion introduced to the octahedral or tetrahedral sites, one $Y^{3+}$ ion can be substituted with a $Ca^{2+}$ ion. For each 5+ ion, two $Y^{3+}$ ions can be replaced by $Ca^{2+}$ ions. For each 6+ ion, three $Y^{3+}$ ions can be replaced by $Ca^{2+}$ ions. For each 6+ ion, three $Y^{3+}$ ions can be replaced by $Ca^{2+}$ ions. In one embodiment, one or more high valence ions $M^{4+}$ selected from the group consisting of $Zr^{4+}$, $Sn^{4+}$, $Ti^{4+}$ is introduced to the octahedral or tetrahedral sites, and divalent calcium ($Ca^{2+}$) is used to balance the charges, which in turn reduces the $Y^{3+}$ content.

In some embodiments, an yttrium-based garnet is modified by introducing one or more high valency ions, such as vanadium ($V^{5+}$), to the tetrahedral site of the garnet structure to substitute for $Fe^{3+}$ to further reduce the magnetic resonance linewidth of the resulting material. Without being bound by any theory, it is believed that the mechanism of ion substitution causes reduced magnetization of the tetrahedral site of the lattice, which results in higher net magnetization of the garnet, and by changing the magnetocrystalline environment of the ferric ions also reduces anisotropy and hence the ferromagnetic linewidth of the material.

In some embodiments, a combination of high bismuth (Bi) doping combined with vanadium (V) and/or zirconium, tin or titanium (Zr, Sn, Ti)-induced calcium (Ca) valency compensation could effectively displace some or all of the yttrium (Y) in microwave device garnets. Similarly, a combination of high bismuth (Bi) doping combined with vanadium (V) and/or In-induced calcium (Ca) valency compensation could effectively displace some or all of the yttrium (Y) in some microwave device garnets. Further, certain other high valency ions could also be used on the tetrahedral of octahedral sites and that a fairly high level of octahedral substitution in the garnet structure is preferred in order to obtain minimized magnetic resonance linewidth. Moreover, yttrium displacement can be accomplished by adding calcium in addition to bismuth to the dodecahedral site. Doping the octahedral or tetrahedral sites with higher valency ions, preferably greater than 3+, could allow more calcium to be introduced to the dodecahedral site to compensate for the charges, which in turn would result in further reduction of yttrium content.

Modified Synthetic Garnet Compositions & Properties

Disclosed herein are modified synthetic garnets having very high dielectric constants, while additionally having high magnetization levels, making them particularly useful for high frequency applications. In particular, increased amount of bismuth, along with balancing charges from other elements, can be added into the crystal structure in order to improve the magnetoelectric properties of the garnet while not reducing other magnetoelectric properties.

In various embodiments, a ceramic article for radio frequency (RF) applications is formed of a ceramic material having a modified synthetic garnet composition that can be represented by: $Bi_{1.0+a}Y_{2.0-a-x-2y}Ca_{x+2y}Fe_{5-x-y}M^{IV}_xV_yO_{12}$, where $M^{IV}$=Zr, Sn or Ti, $0<x\leq0.5$, $0\leq y\leq0.25$ and $0\leq a\leq0.5$.

In various other embodiments, a ceramic article for radio frequency applications is formed of a ceramic material having a chemical formula represented by: $Bi_{1.0+a}Y_{2.0-a-2y}Ca_{2y}Fe_{5-y-z}V_yIn_zO_{12}$, wherein: $0<z\leq0.5$, $0\leq y\leq0.25$, and $0\leq a\leq0.5$.

The inventors have discovered that the presence of each of the elements in the stated amounts can be critical for achieving combinations of physical properties described herein that may be particularly suitable for the reduced size isolators and circulators formed as a single piece article, enabled in part by the high dielectric constant, as described herein.

The inventors have discovered, among other technical effects, that bismuth (Bi) present in the particular amounts (1.0+a in $Bi_{1.0+a}Y_{2.0-a-x-2y}Ca_{x+2y}Fe_{5-x-y}M^{IV}_xV_yO_{12}$ and $Bi_{1.0+a}Y_{2.0-a-2y}Ca_{2y}Fe_{5-y-z}V_yIn_zO_{12}$) described herein can be effective or critical in tuning, among other physical parameters, the dielectric constant of the ceramic material to be in the particular ranges described herein, e.g., >28. In various embodiments, about 1.0-1.5 formula units of Bi can be substituted for some of the yttrium (Y) at the dodecahedral site in the form of $Bi^{3+}$. For example, the amount of Bi present can be 1.0-1.5, 1.1-1.5, 1.2-1.5, 1.3-1.5, 1.35-1.45 formula units, or a value in a range defined by any of these values, for instance about 1.4 formula units.

The high levels of bismuth, which can result in advantageous properties, can be achieved through certain atom inclusions and methods of manufacturing, as discussed below.

The inventors have discovered that, among other technical effects, vanadium (V) present in the particular amounts (y in $Bi_{1.0+a}Y_{2.0-a-x-2y}Ca_{x+2y}Fe_{5-x-y}M^{IV}_xV_yO_{12}$, and $Bi_{1.0+a}Y_{2.0-a-2y}Ca_{2y}Fe_{5-y-z}V_yIn_zO_{12}$) described herein can be effective or critical in tuning, among other physical parameters, the saturation magnetization ($M_s$) of the ceramic material to be in the particular ranges described herein, e.g., about 1550-1850 Gauss, while keeping the Curie temperature relatively high, e.g., >200° C. In various embodiments, about 0-0.25 formula units of V can be substituted for some of the iron (Fe) at the tetrahedral site in the form of $V^{5+}$. For example, the amount of V present can be 0-0.05, 0.05-0.10, 0.10-0.15, 0.15-0.20, 0.20-0.25 formula units, or a value in a range defined by any of these values, for instance about 0.14 formula units.

The inventors have discovered, among other technical effects, that $M^{IV}$ (Zr, Sn or Ti) present in the particular amounts (x in $Bi_{1.0+a}Y_{2.0-a-x-2y}Ca_{x+2y}Fe_{5-x-y}M^{IV}_xV_yO_{12}$) or In present in the particular amounts (z in $Bi_{1.0+a}Y_{2.0-a-2y}Ca_{2y}Fe_{5-y-z}V_yIn_zO_{12}$) as described herein can be effective or critical in tuning, among other physical parameters, the magnetocrystalline anisotropy energy and therefore the 3 dB resonant linewidth of the ceramic material to be in the particular ranges described herein. In various embodiments, about 0-0.5 formula units of $M^{IV}$ or In can be substituted for some of the iron (Fe) at the octahedral site in the form of $M^{4+}$ or $In^{3+}$. For example, the amount of $M^{IV}$ or In present can be 0-0.10, 0.10-0.20, 0.20-0.30, 0.30-0.40, 0.40-0.50 formula units, or a value in a range defined by any of these values, for instance about 0.40 formula units.

Additionally, as shown in the chemical formula of the ceramic material, charge balance for the inclusion of $M^{IV}$ and/or V can be achieved by particular amounts (x+2y in $Bi_{1.0+a}Y_{2.0-a-x-2y}Ca_{x+2y}Fe_{5-x-y}M^{IV}_xV_yO_{12}$) of calcium (Ca) substituting for some of the remaining yttrium (Y) in the dodecahedral site in the form of $Ca^{2+}$. Similarly, charge balance for the inclusion of In and/or V can be achieved by particular amounts (2y in $Bi_{1.0+a}Y_{2.0-a-2y}Ca_{2y}Fe_{5-y-z}V_yIn_zO_{12}$) of calcium (Ca) substituting for some of the remaining yttrium (Y) in the dodecahedral site in the form of $Ca^{2+}$.

In the following, various experimental results pertaining to ferrite compositions comprising Bi, Y, Ca, $M^{IV}$ and V are presented, where $M^{IV}$ is one of Zr, Sn or Ti. In particular, the experimental results pertain to ferrites in which $M^{IV}$ is Zr. However, while not presented herein for brevity, similar results can be obtained for similar ferrites in which $M^{IV}$ is Sn or Ti and ferrites comprising Bi, Y, Ca, In and V.

FIGS. 4A-4J are graphs showing various experimentally measured physical characteristics of the ceramic materials according to embodiments. In particular, the measurements are those of a particular composition represented by $Bi_{1.0+a}Y_{2.0-a-x-2y}Ca_{x+2y}Fe_{5-x-y}M^{IV}_xV_yO_{12}$ where $M^{IV}$=Zr, a=0.4, x=0.5, and y is varied between 0.14 and 0.25. For parameters measured after annealing, the annealing was performed at a temperature of 895-935° C. for 50-100 hours in either air or oxygen.

Figure 4A:
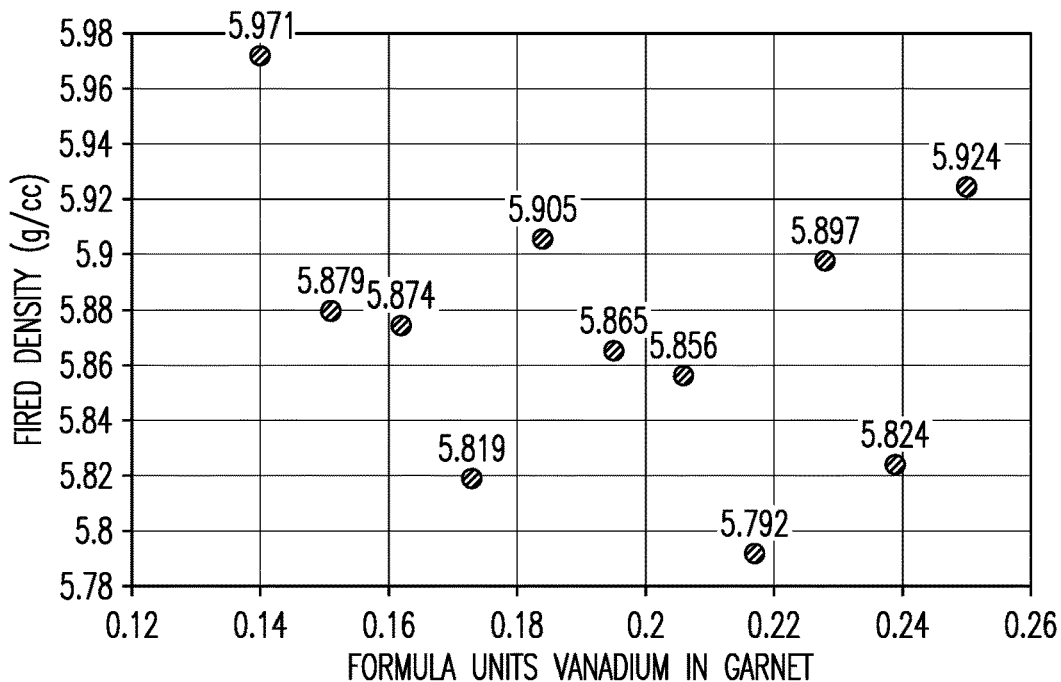
FIG. 4A is a graph of experimentally measured fired density as a function of vanadium content for some ferrites according to embodiments.

FIG. 4A is a graph of experimentally measured fired density as a function of vanadium content for some ferrites according to embodiments. Within at least the illustrated range, the fired density is maintained above 5.79 g/cc.

Figure 4B:
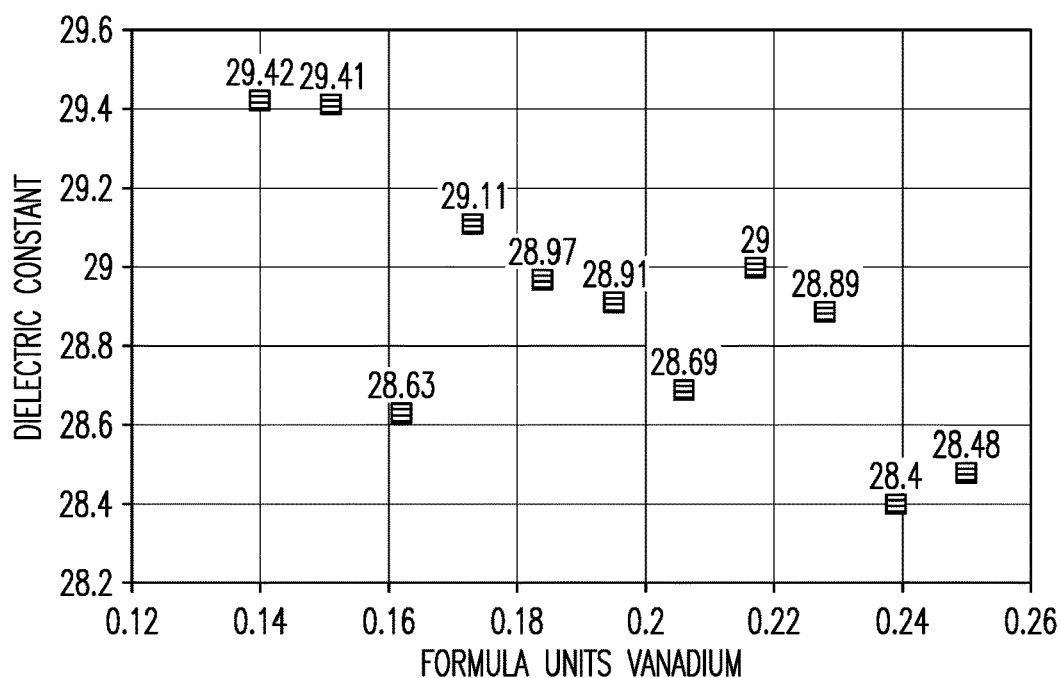
FIG. 4B is a graph of experimentally measured dielectric constant as a function of vanadium content for some ferrites according to embodiments.

FIG. 4B is a graph of experimentally measured dielectric constant as a function of vanadium content for some ferrites according to embodiments. As illustrated, V content controls, among other things, the dielectric constant. Within at least the illustrated range, the dielectric constant decreases with increasing V content but maintained above 28.

Figure 4C:
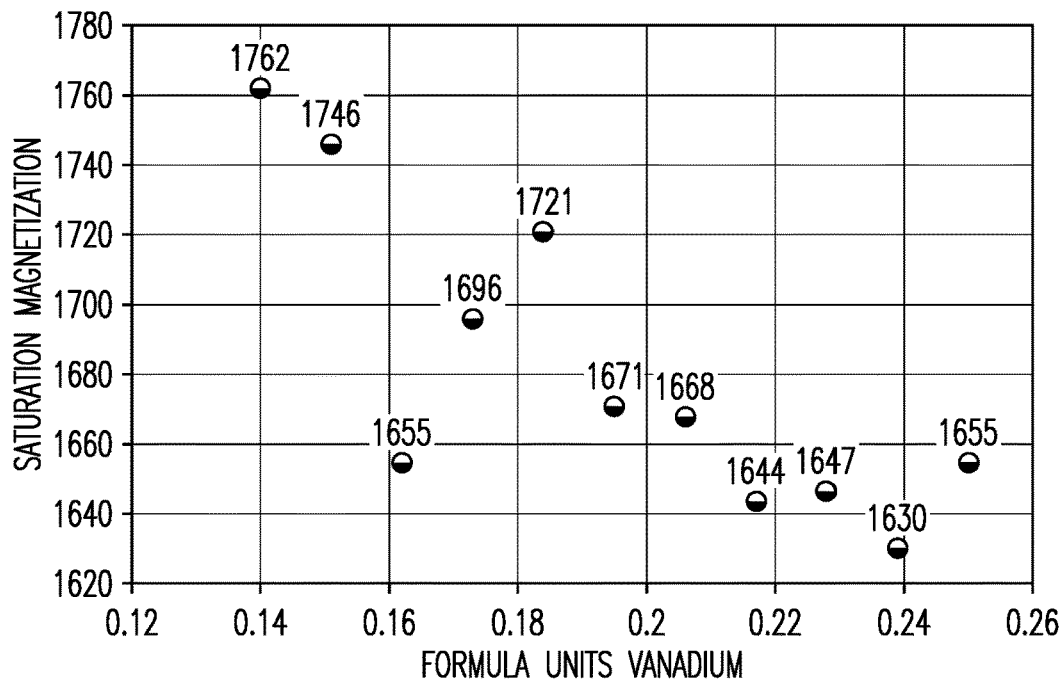
FIG. 4C is a graph of experimentally measured saturation magnetization as a function of vanadium content for some ferrites according to embodiments.

FIG. 4C is a graph of experimentally measured saturation magnetization as a function of vanadium content for some ferrites according to embodiments. As illustrated, V content controls, among other things, the saturation magnetization. Within at least the illustrated range, the saturation magnetization decreases with increasing V content but maintained at about 1600-1800 Gauss.

Figure 4D:
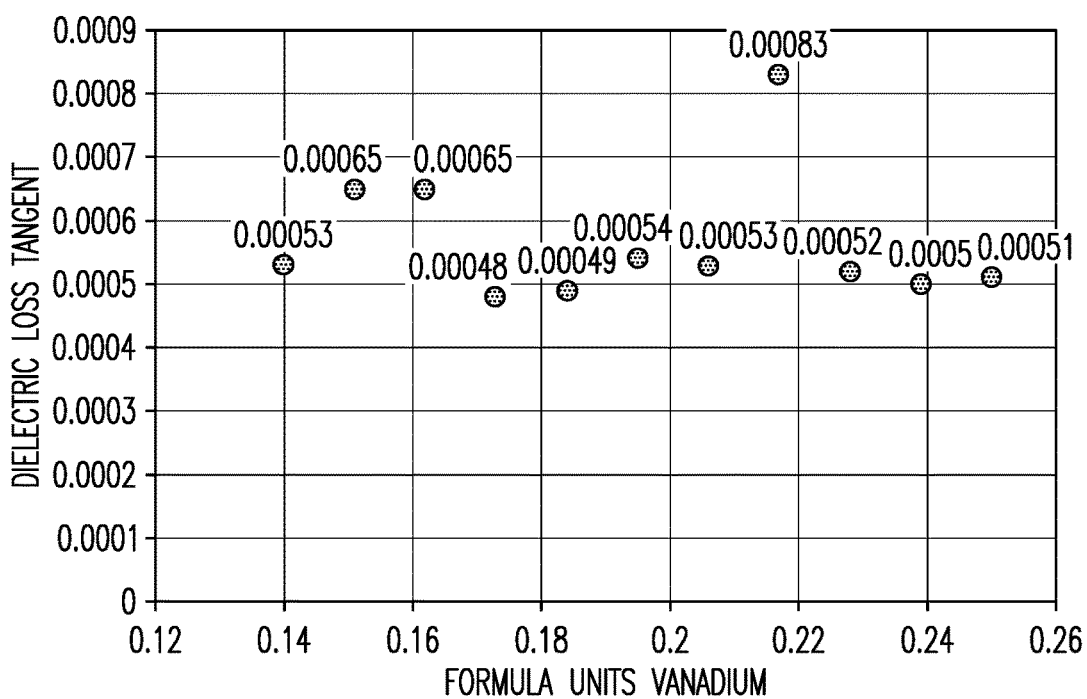
FIG. 4D is a graph of experimentally measured dielectric loss tangent as a function of vanadium content for some ferrites according to embodiments.

FIG. 4D is a graph of experimentally measured dielectric loss tangent as a function of vanadium content for some ferrites according to embodiments. Within at least the illustrated range, the dielectric loss tangent is maintained below about 0.0009.

Figure 4E:
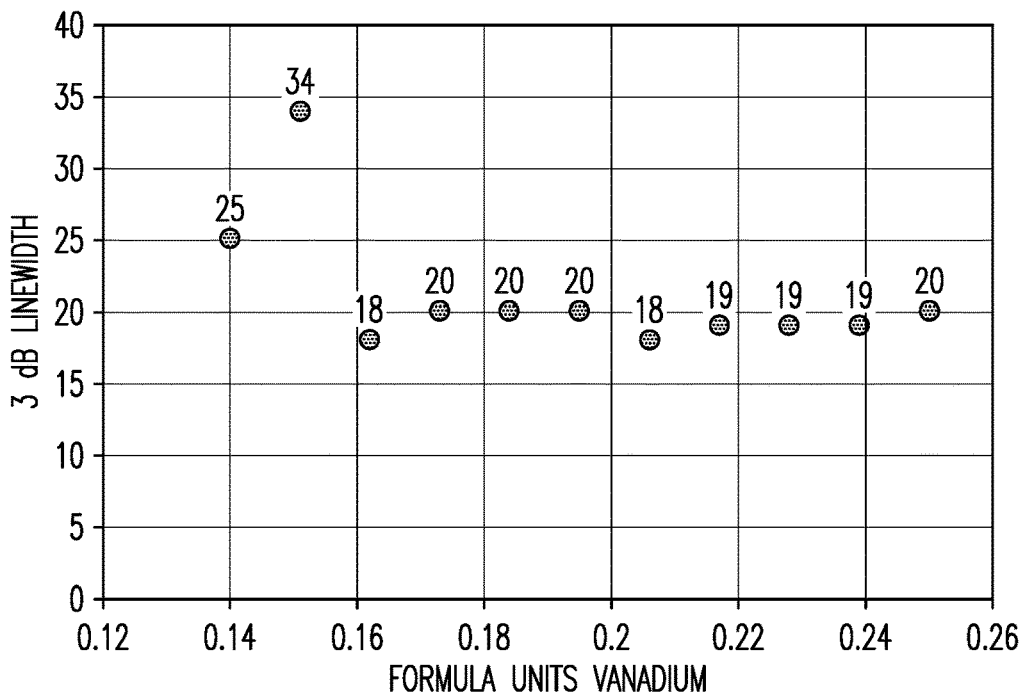
FIG. 4E is a graph of experimentally measured 3 dB linewidth as a function of vanadium content for some ferrites according to embodiments.

FIG. 4E is a graph of experimentally measured 3 dB linewidth as a function of vanadium content for some ferrites according to embodiments. Within at least the illustrated range, the 3 dB linewidth s maintained below about 34 Oe.

Figure 4F:
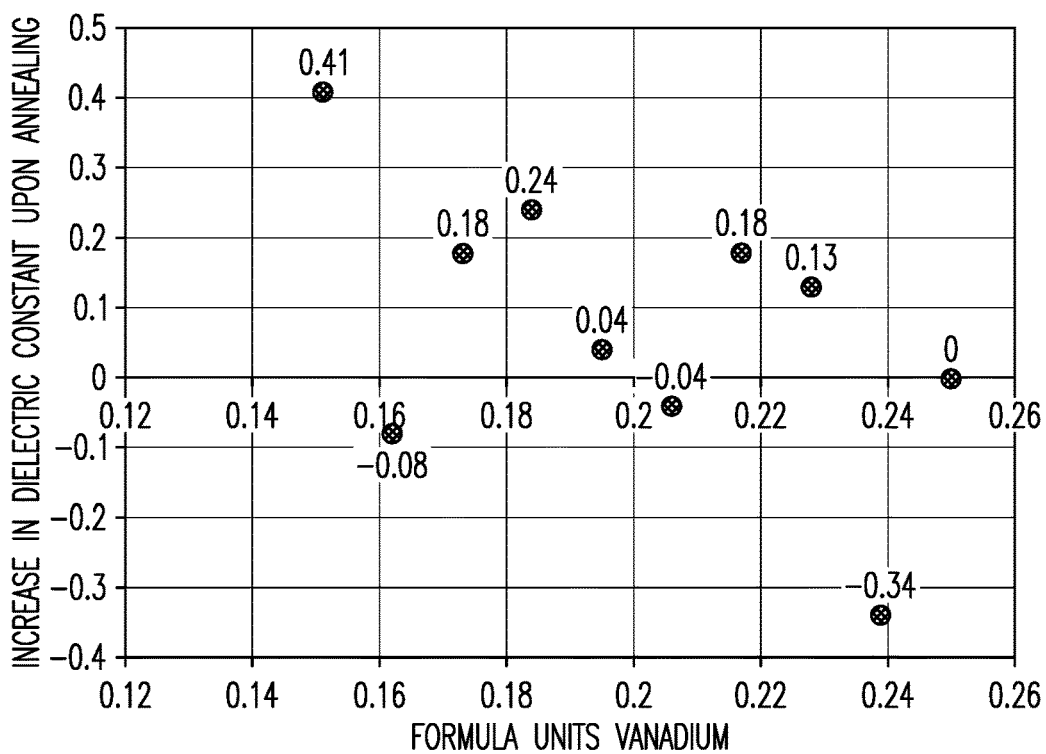
FIG. 4F is a graph of experimentally measured change in dielectric constant upon annealing as a function of vanadium content for some ferrites according to embodiments.

FIG. 4F is a graph of experimentally measured change in dielectric constant upon annealing as a function of vanadium content for some ferrites according to embodiments. Within at least the illustrated range, the change in dielectric constant ranges between about −0.34 and 0.41.

Figure 4G:
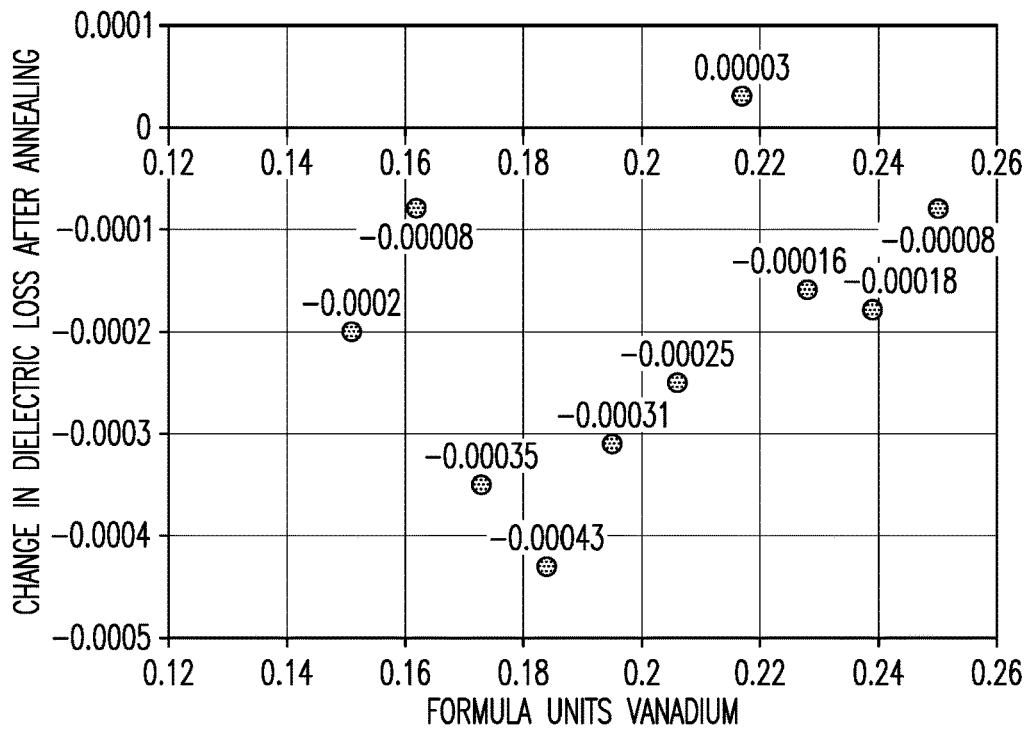
FIG. 4G is a graph of experimentally measured change in dielectric loss upon annealing as a function of vanadium content for some ferrites according to embodiments.

FIG. 4G is a graph of experimentally measured change in dielectric loss upon annealing as a function of vanadium content for some ferrites according to embodiments. Within at least the illustrated range, the change in dielectric loss ranges between about −0.00043 and 0.00003.

Figure 4H:
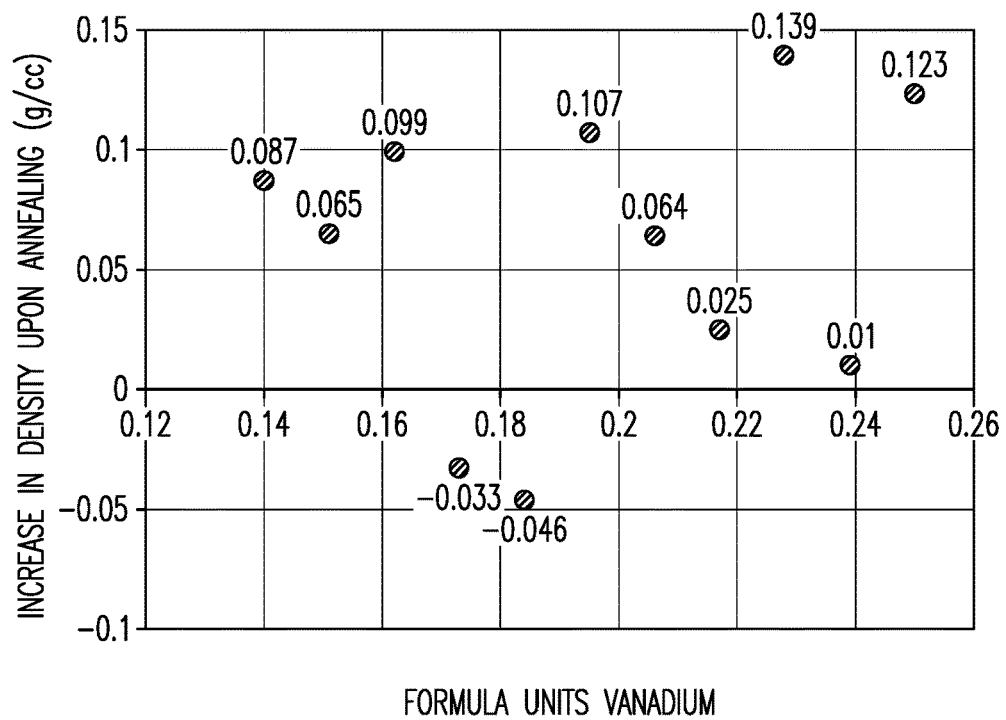
FIG. 4H is a graph of experimentally measured change in density upon annealing as a function of vanadium content for some ferrites according to embodiments.

FIG. 4H is a graph of experimentally measured change in density upon annealing as a function of vanadium content for some ferrites according to embodiments. Within at least the illustrated range, the change in density ranges between about −0.046 and 0.139 g/cc.

Figure 4I:
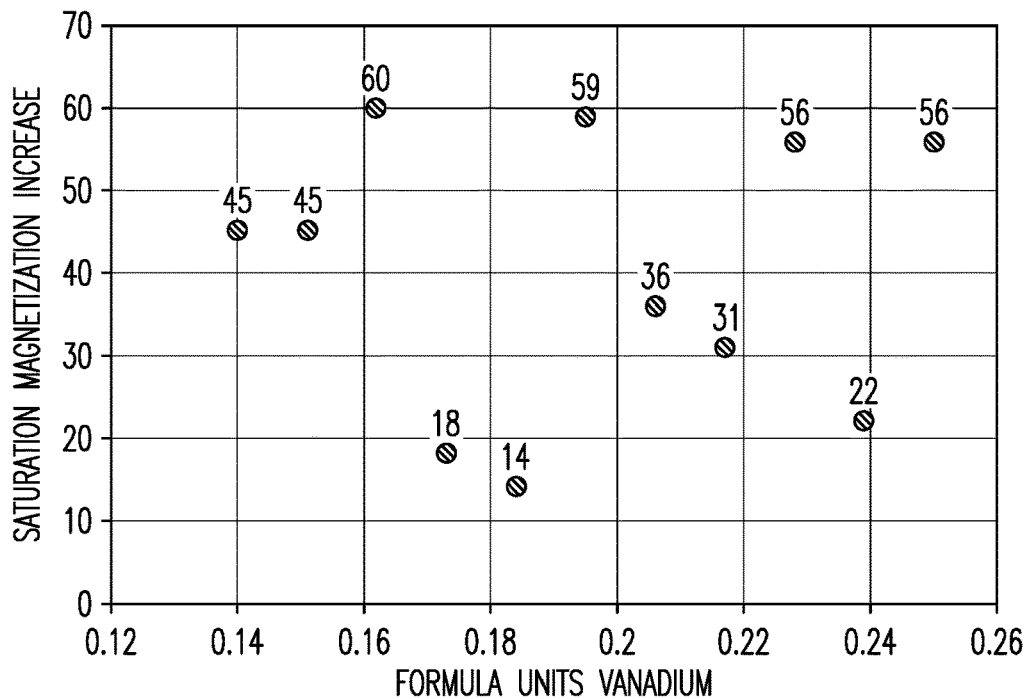
FIG. 4I is a graph of experimentally measured change in saturation magnetization upon annealing as a function of vanadium content for some ferrites according to embodiments.

FIG. 4I is a graph of experimentally measured change in saturation magnetization upon annealing as a function of vanadium content for some ferrites according to embodiments. Within at least the illustrated range, the change in saturation magnetization ranges between about 14 and 60 Gauss.

Figure 4J:
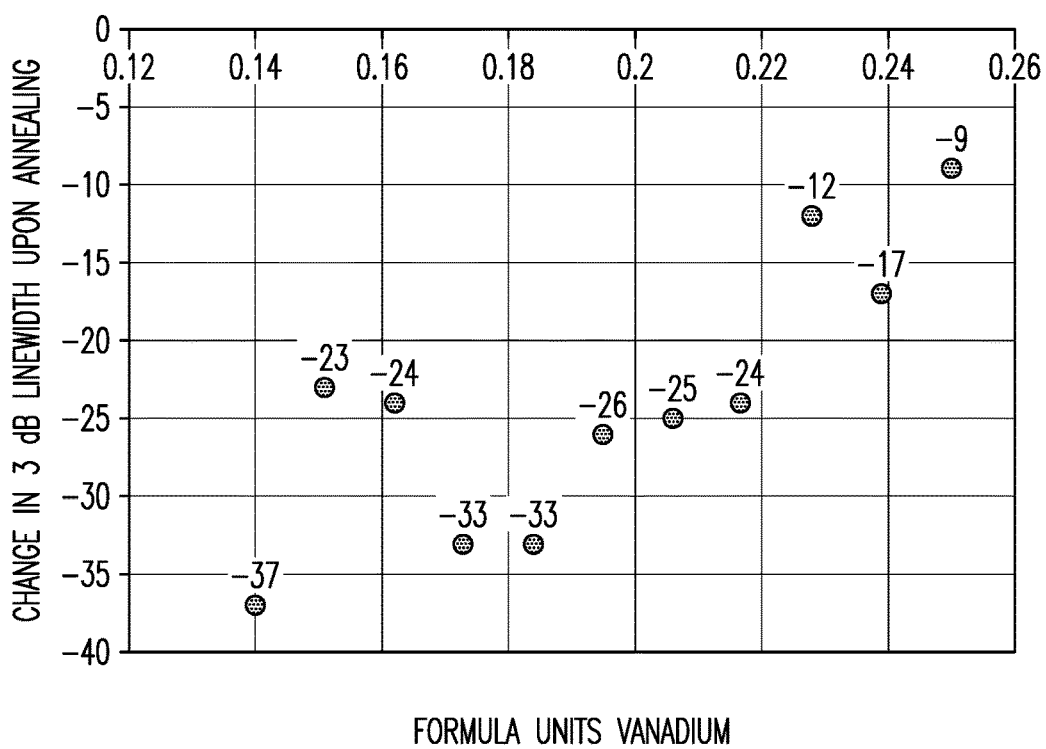
FIG. 4J is a graph of experimentally measured change in 3 dB linewidth upon annealing as a function of vanadium content for some ferrites according to embodiments.

FIG. 4J is a graph of experimentally measured change in 3 dB linewidth upon annealing as a function of vanadium content for some ferrites according to embodiments. Within at least the illustrated range, the change in the 3 dB linewidth ranges between about −9 and −37 Oe.

FIGS. 5A-5J are graphs showing various experimentally measured physical characteristics of the ceramic materials according to embodiments. In particular, the measurements are those of a particular composition represented by $Bi_{1.0+a}Y_{2.0-a-x-2y}Ca_{x+2y}Fe_{5-x-y}M^{IV}_xV_yO_{12}$ where $M^{IV}$=Zr, a=0.4, x is varied between 0.25 and 0.5, and y is varied between 0.14 and 0.25. For parameters measured after annealing, the annealing was performed at a temperature of 895-935° C. for 50-100 hours in either air or oxygen.

Figure 5A:
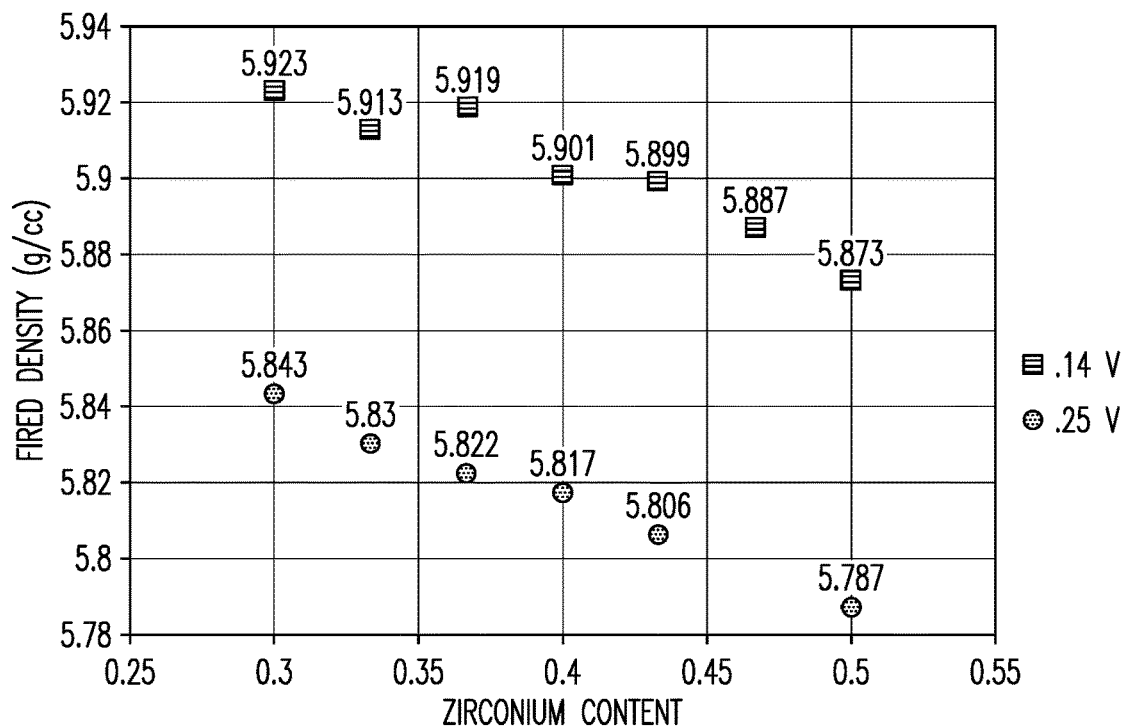
FIG. 5A is a graph of experimentally measured fired density as a function of zirconium and vanadium content for some ferrites according to embodiments.

FIG. 5A is a graph of experimentally measured fired density as a function of zirconium and vanadium content for some ferrites according to embodiments. As illustrated, increasing V and increasing Zr both decreases the fired density. Within at least the illustrated range, the fired density is maintained above 5.79 g/cc.

Figure 5B:
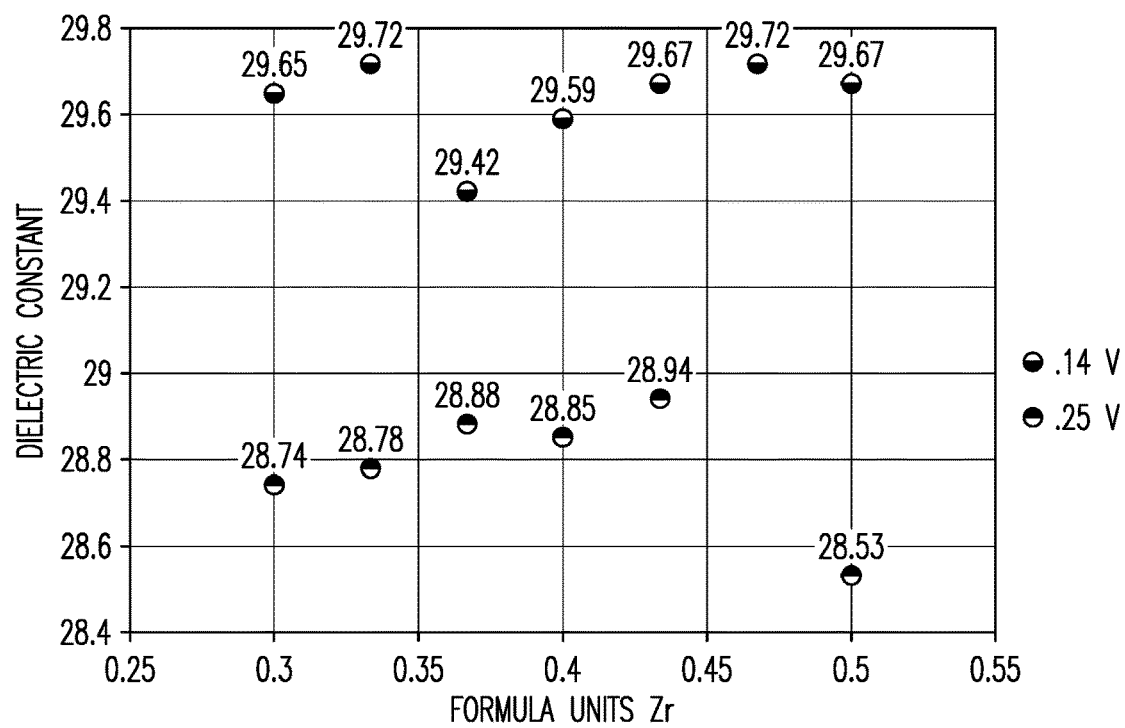
FIG. 5B is a graph of experimentally measured dielectric constant as a function of zirconium and vanadium content for some ferrites according to embodiments.

FIG. 5B is a graph of experimentally measured dielectric constant as a function of zirconium and vanadium content for some ferrites according to embodiments. As illustrated, V content controls, among other things, the dielectric constant. Within at least the illustrated range, the dielectric constant decreases with increasing V content but maintained above 28.

Figure 5C:
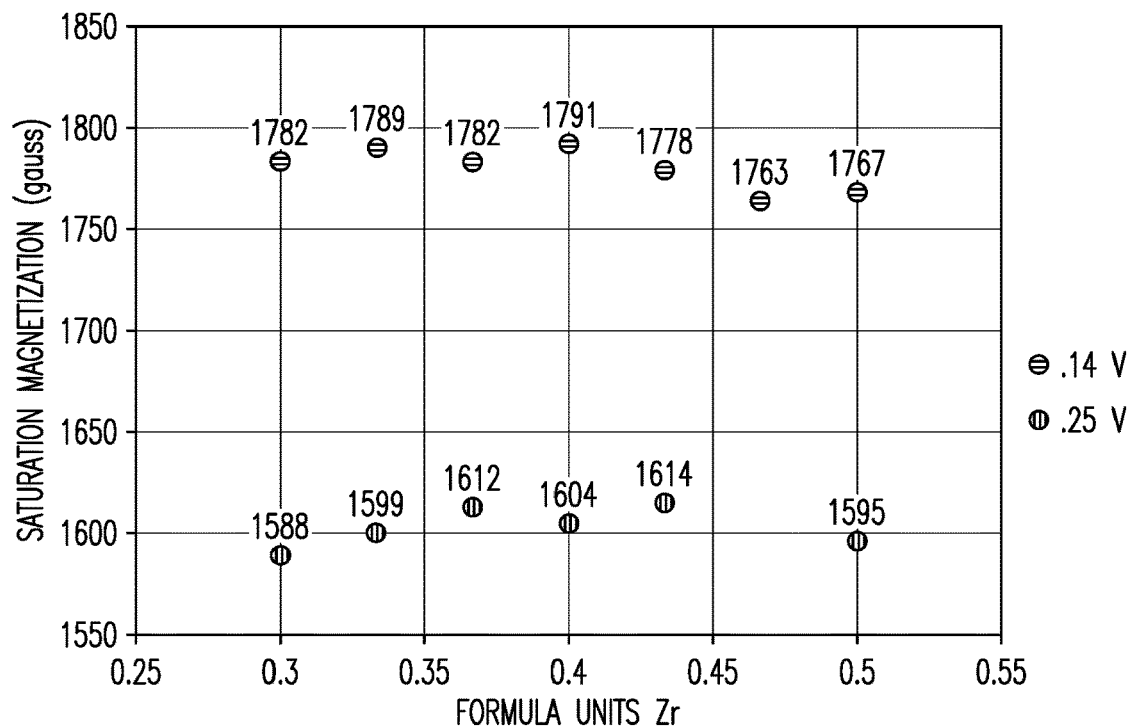
FIG. 5C is a graph of experimentally measured saturation magnetization as a function of zirconium and vanadium content for some ferrites according to embodiments.

FIG. 5C is a graph of experimentally measured saturation magnetization as a function of zirconium and vanadium content for some ferrites according to embodiments. As illustrated, V content controls, among other things, the saturation magnetization. Within at least the illustrated range, the saturation magnetization decreases with increasing V content but maintained at about 1600-1800 Gauss.

Figure 5D:
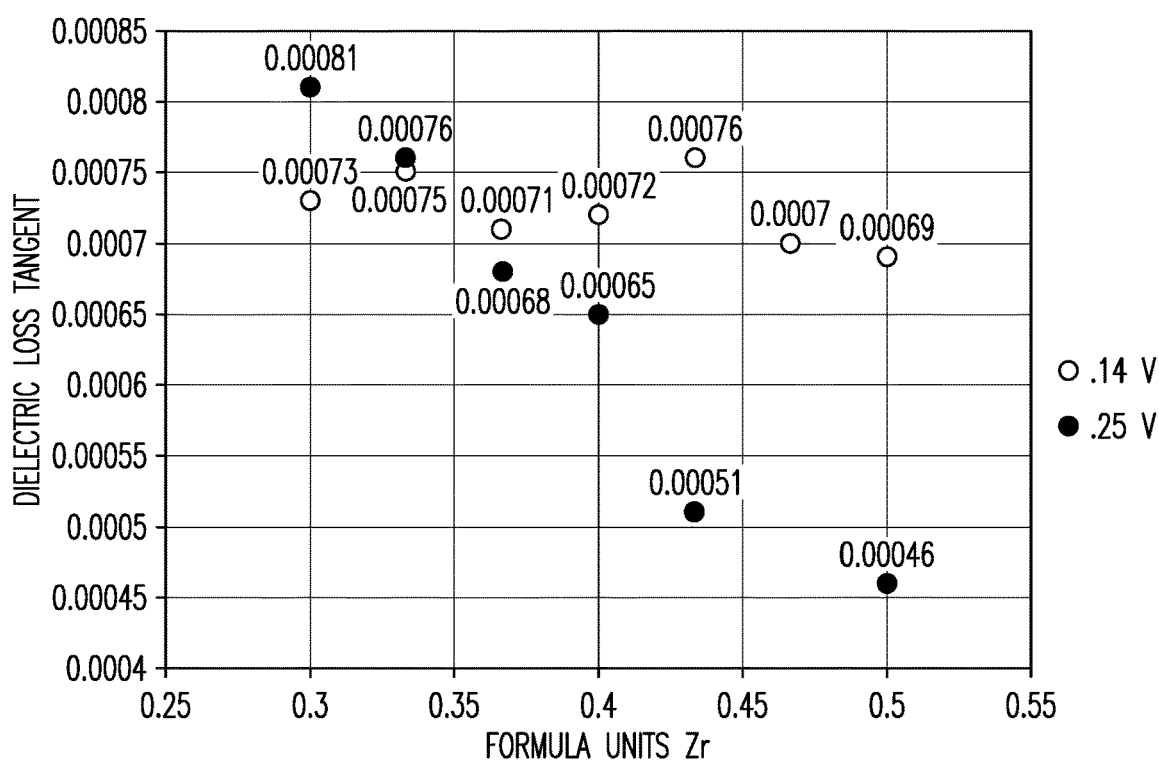
FIG. 5D is a graph of experimentally measured dielectric loss tangent as a function of zirconium and vanadium content for some ferrites according to embodiments.

FIG. 5D is a graph of experimentally measured dielectric loss tangent as a function of zirconium and vanadium content for some ferrites according to embodiments. As illustrated, increasing the Zr content for V content of about 0.25 decreases the dielectric loss tangent. Within at least the illustrated range, the dielectric loss tangent is maintained below about 0.0009.

Figure 5E:
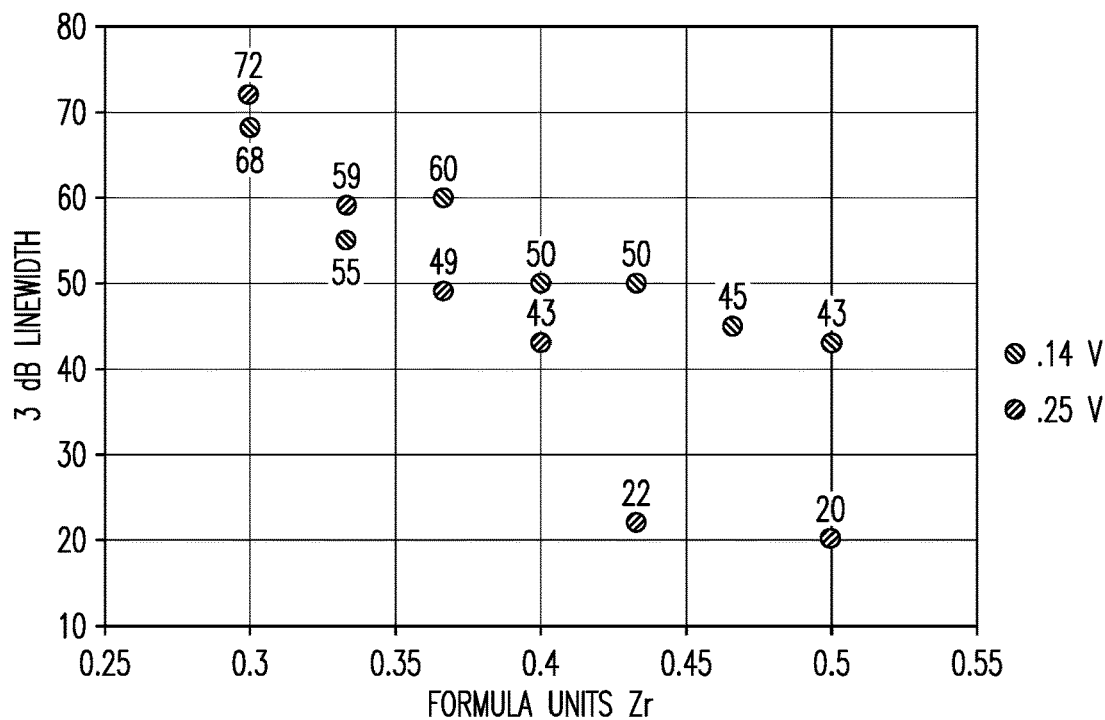
FIG. 5E is a graph of experimentally measured 3 dB linewidth as a function of zirconium and vanadium content for some ferrites according to embodiments.

FIG. 5E is a graph of experimentally measured 3 dB linewidth as a function of zirconium and vanadium content for some ferrites according to embodiments. As illustrated, increasing the Zr content decreases the 3 dB linewidth. Within at least the illustrated range, the 3 dB linewidth s maintained below about 72 Oe.

Figure 5F:
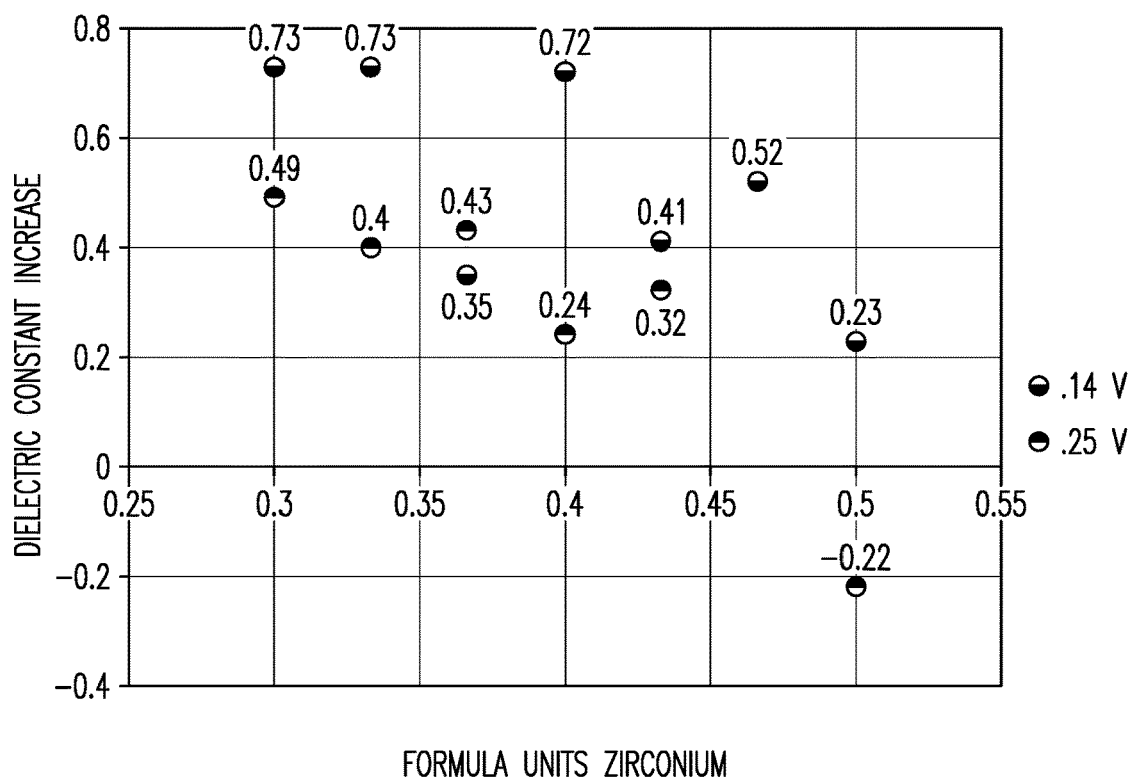
FIG. 5F is a graph of experimentally measured change in dielectric constant upon annealing as a function of zirconium and vanadium content for some ferrites according to embodiments.

FIG. 5F is a graph of experimentally measured change in dielectric constant upon annealing as a function of zirconium and vanadium content for some ferrites according to embodiments. Within at least the illustrated range, the change in dielectric constant ranges between about −0.22 and 0.73.

Figure 5G:
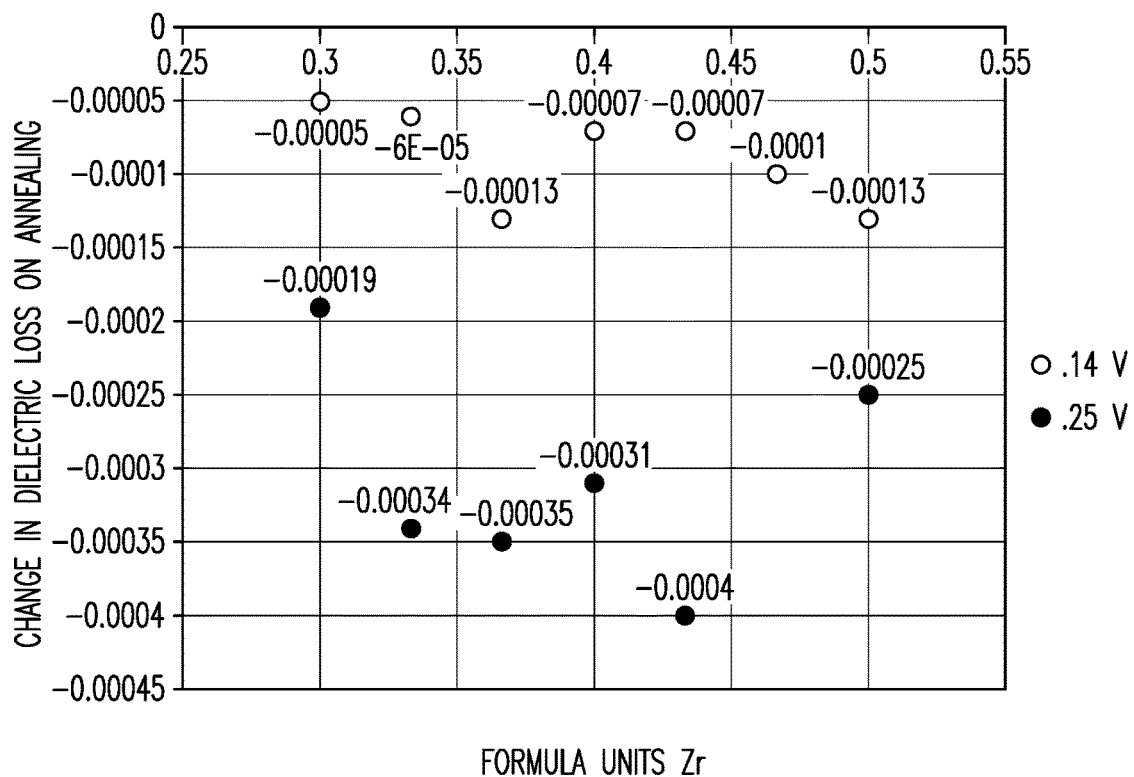
FIG. 5G is a graph of experimentally measured change in dielectric loss upon annealing as a function of zirconium and vanadium content for some ferrites according to embodiments.

FIG. 5G is a graph of experimentally measured change in dielectric loss upon annealing as a function of zirconium and vanadium content for some ferrites according to embodiments. Within at least the illustrated range, the change in dielectric loss ranges between about −0.0004 and −0.00005.

Figure 5H:
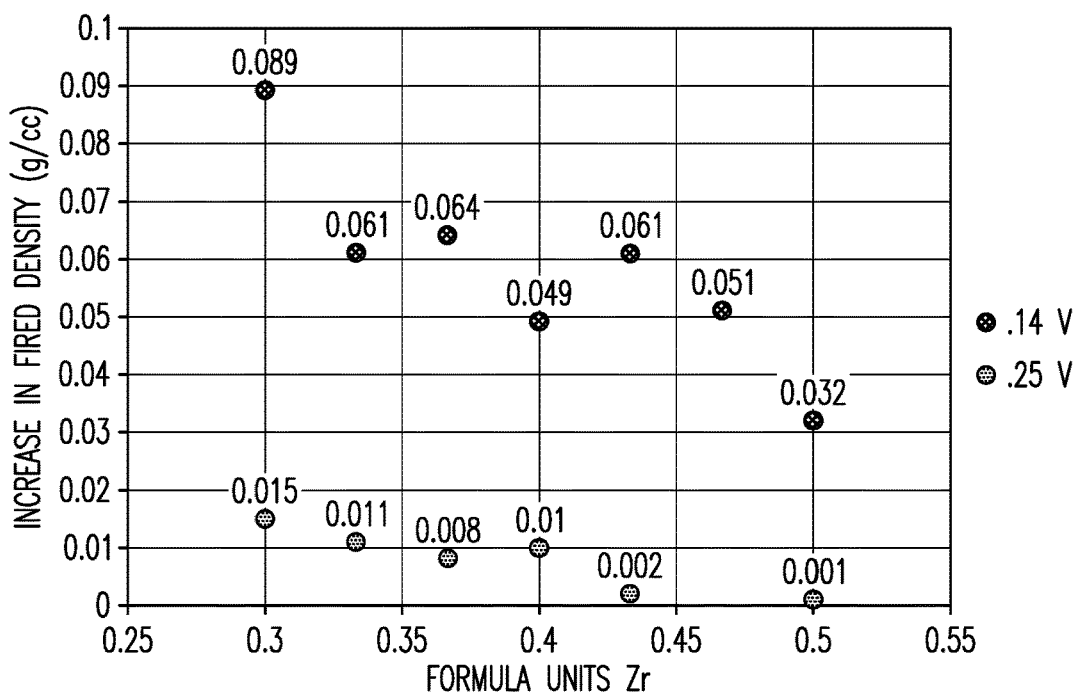
FIG. 5H is a graph of experimentally measured change in density upon annealing as a function of zirconium and vanadium content for some ferrites according to embodiments.

FIG. 5H is a graph of experimentally measured change in density upon annealing as a function of zirconium and vanadium content for some ferrites according to embodiments. Within at least the illustrated range, the change in density ranges between about 0.001 and 0.089 g/cc.

Figure 5I:
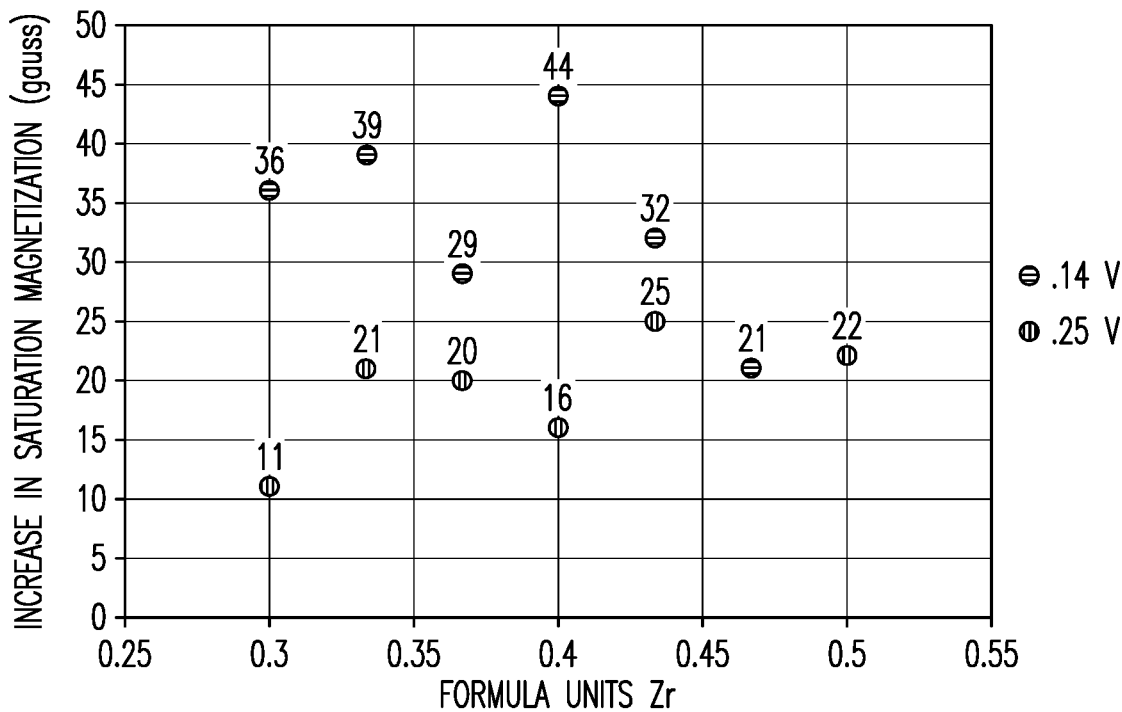
FIG. 5I is a graph of experimentally measured change in saturation magnetization upon annealing as a function of zirconium and vanadium content for some ferrites according to embodiments.

FIG. 5I is a graph of experimentally measured change in saturation magnetization upon annealing as a function of zirconium and vanadium content for some ferrites according to embodiments. Within at least the illustrated range, the change in saturation magnetization ranges between about 11 and 4 Gauss.

Figure 5J:
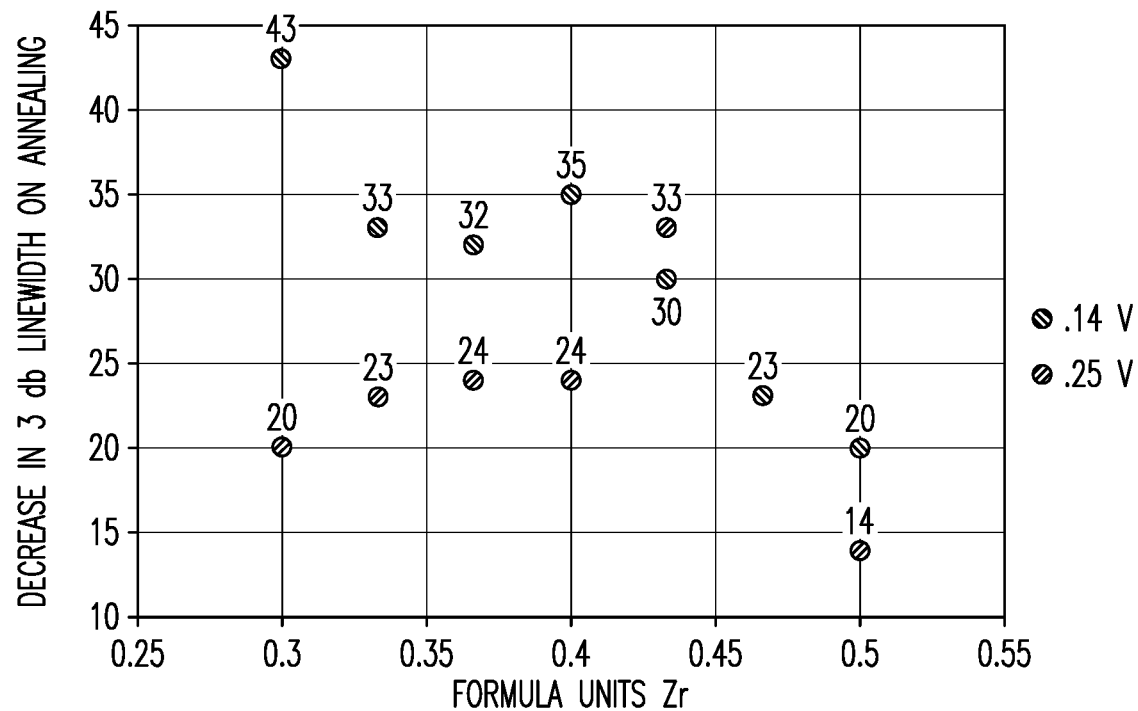
FIG. 5J is a graph of experimentally measured change in 3 dB linewidth upon annealing as a function of zirconium and vanadium content for some ferrites according to embodiments.

FIG. 5J is a graph of experimentally measured change in 3 dB linewidth upon annealing as a function of zirconium and vanadium content for some ferrites according to embodiments. Within at least the illustrated range, the change in the 3 dB linewidth ranges between about 14 and 43 Oe.

Figure 6:
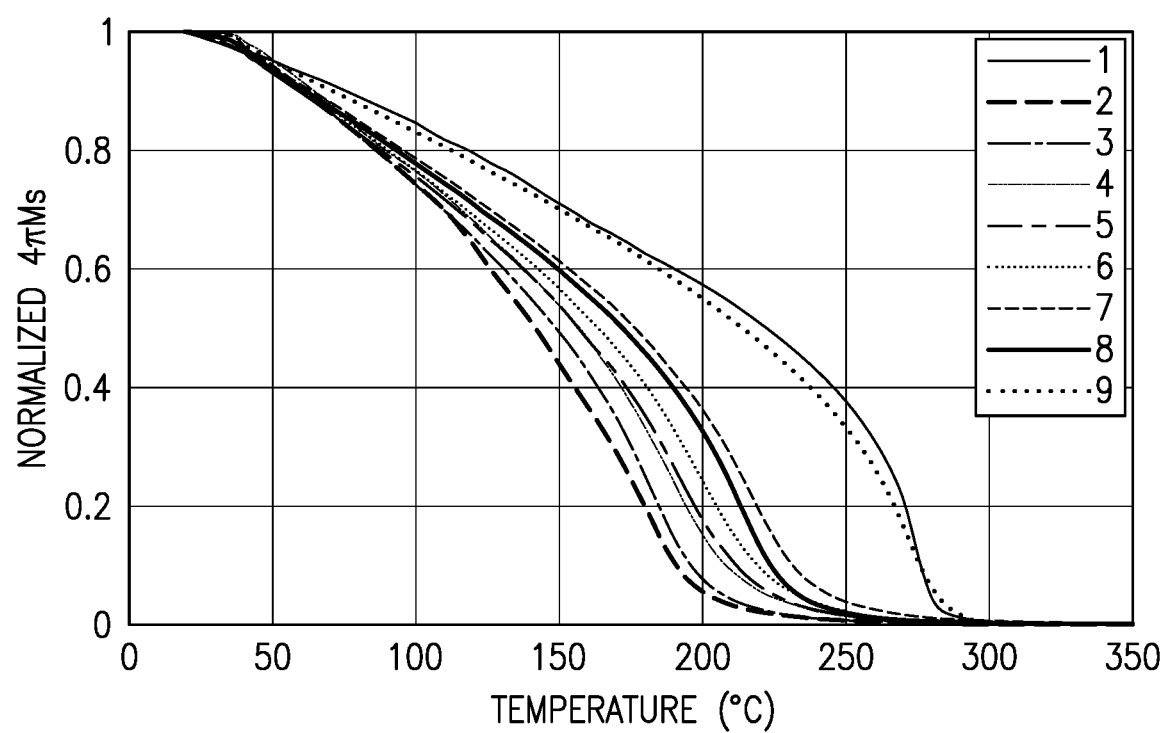
FIG. 6 are graphs of saturation magnetization ($M_s$) as a function of temperature for some ferrites according to embodiments.

FIG. 6 are graphs of saturation magnetization (Ms) as a function of temperature for some ceramic materials according to embodiments. As observed, the Ms generally decrease with temperature, and the rate of decrease of the $M_S$ accelerates as the temperature approaches the Curie Temperature ($T_C$). The inventors have discovered that the rate of change of the $M_s$ within a temperature range that is similar to operational temperatures can be an important indicator, at least because it indicates the relatively temperature independent behavior of the $M_S$, which in turn translates to higher stability of performance of components made from such ceramic material e.g., isolators and circulators. As such, the inventors have discovered that, in order to achieve the performance goals including, among other things, intermodulation performance and high fractional bandwidths, while maintaining a relatively insertion loss, a relevant figure of merit can be a normalized change in saturation magnetization ($\Delta 4\pi Ms$), defined herein as $\Delta 4\pi Ms = [(4\pi Ms$ at 20° C.)$-(4\pi Ms$ at 120° C.$)]/(4\pi Ms$ at 20° C.). According to various embodiments, a ceramic article for radio frequency (RF) applications is formed of a ceramic material having a modified synthetic garnet composition that can be represented by $Bi_{1.0+a}Y_{2.0-a-x-2y}Ca_{x+2y}Fe_{5-x-y}M^{IV}_xV_yO_{12}$ or $Bi_{1.0+a}Y_{2.0-a-2y}Ca_{2y}Fe_{5-y-z}V_yIn_zO_{12}$, wherein the ceramic material has a composition such that the $\Delta 4\pi Ms$ is less than 0.35. To illustrate the various dependences thereof, the inventors have measured the $\Delta 4\pi Ms$ against various material parameters, as follows. TABLES IA and IB are a list of measured sample compositions and selected measurements, for illustration purposes, for which the $\Delta 4\pi Ms$ has been characterized, as illustrated in FIGS. 6-9. It will be appreciated that, referring to TABLE IA, Samples 1-3 have compositions that are outside of the composition according to various embodiments disclosed herein, which can be represented by: $Bi_{1.0+a}Y_{2.0-a-x-2y}Ca_{x+2y}Fe_{5-x-y}M^{IV}_xV_yO_{12}$, where $M^{IV}$=Zr, Sn or Ti, $0<x \leq 0.5$, $0 \leq y \leq 0.25$ and $0 \leq a \leq 0.5$.

TABLE IA

| Sample | Composition |
|---|---|
| 1 | $Y_3Fe_5O_{12}$ |
| 9 | $Bi_{1.4}Ca_{.25}Y_{1.35}Zr_{.25}Fe_{4.75}O_{12}$ |
| 8 | $Bi_{1.4}Ca_{.5}Y_{1.1}Zr_{.5}Fe_{4.5}O_{12}$ |
| 7 | $Bi_{1.4}Ca_{.62}Y_{.98}Zr_{.5}V_{.06}Fe_{4.44}O_{12}$ |
| 6 | $Bi_{1.4}Ca_{.78}Y_{.82}Zr_{.5}V_{.14}Fe_{4.36}O_{12}$ |
| 5 | $Bi_{1.4}Ca_{.88}Y_{.72}Zr_{.5}V_{.19}Fe_{4.31}O_{12}$ |
| 4 | $Bi_{1.4}CaY_{.60}Zr_{.5}V_{.25}Fe_{4.25}O_{12}$ |
| 3 | $Bi_{1.4}Ca_{1.22}Y_{.38}Zr_{.5}V_{.36}Fe_{4.11}O_{12}$ |
| 2 | $Bi_{1.4}Ca_{1.58}Y_{.02}Zr_{.53}V_{.525}Fe_{3.945}O_{12}$ |

TABLE IB

| Sample No. | QCMS | TC (° C.) | 4πMs [RT] | Δ4πMs [{RT − 120 C.)/RT] | Linewidth [G] | Dielectric constant | Dielectric Loss | V-Content (y) | Zr-Content (x) |
|---|---|---|---|---|---|---|---|---|---|
| 1 | 1355932 | 281 | 1774 | 0.21807819 | 21 | 14.54 | 0.0001 | 0 | 0 |
| | 1425463 | 197 | 1159 | 0.365258844 | 41 | 26.7 | 0.00088 | 0.525 | 0.53 |
| 3 | 1450171 | 208 | 1365 | 0.3720042 | 32 | 27.72 | 0.00072 | 0.36 | 0.5 |
| 4 | 1450422 | 214 | 1615 | 0.33473562 | 25 | 28.39 | 0.00084 | 0.25 | 0.5 |

TABLE IB-continued

| Sample | QCMS No. | TC (° C.) | 4πMs [RT] | Δ4πMs [{RT − 120 C.)/RT] | Linewidth [G] | Dielectric constant | Dielectric Loss | V-Content (y) | Zr-Content (x) |
|---|---|---|---|---|---|---|---|---|---|
| 5 | 1450456 | 221 | 1666 | 0.342510196 | 71 | 28.72 | 0.00085 | 0.19 | 0.5 |
| 6 | 1450238 | 229 | 1745 | 0.309370243 | 63 | 29.44 | 0.00082 | 0.14 | 0.5 |
| 7 | 14513441 | 242 | 1936 | 0.280123256 | 46 | 30.13 | 0.00046 | 0.06 | 0.5 |
| 8 | 1450878 | 232 | 1989 | 0.290674167 | 39 | 29.67 | 0.00086 | 0 | 0.5 |
| 9 | 31177213A | 284 | 1951 | 0.21980814 | 50 | 31.42 | 0.00082 | 0 | 0.25 |

Figure 7A:
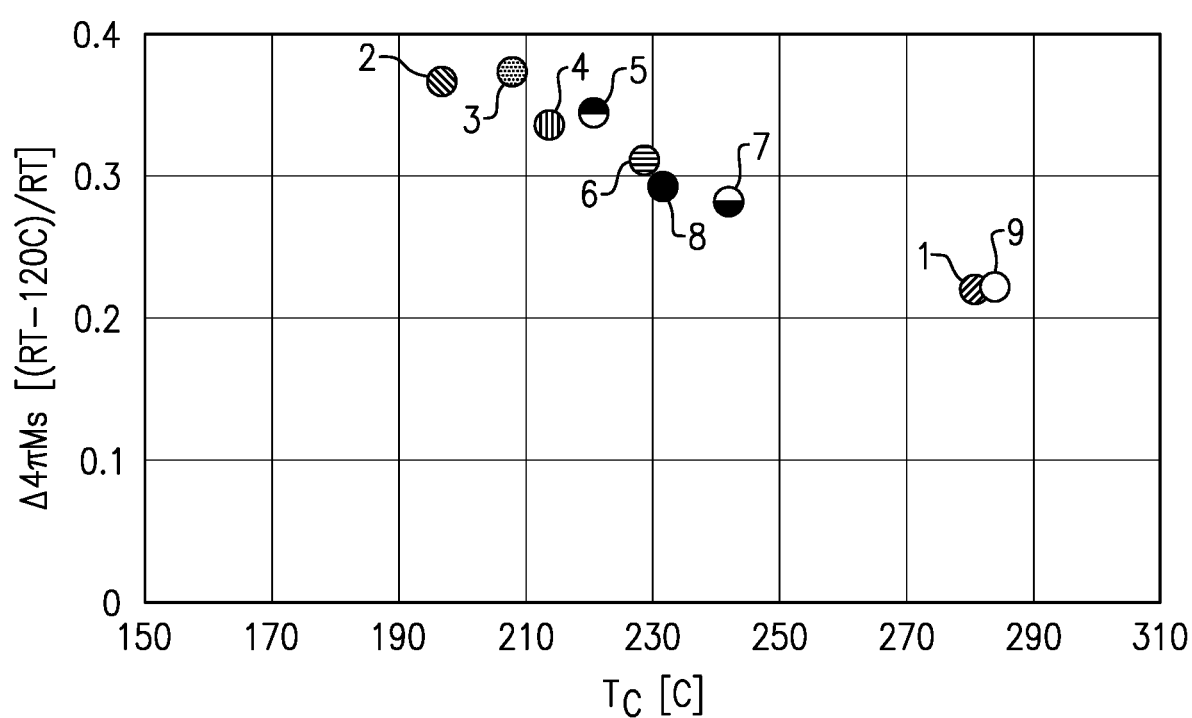
FIGS. 7A-7C are summary graphs of normalized changes in saturation magnetization ($\Delta 4\pi Ms$) in saturation magnetization (Ms) versus various physical parameters of some ferrites according to embodiments.
Figure 7B:
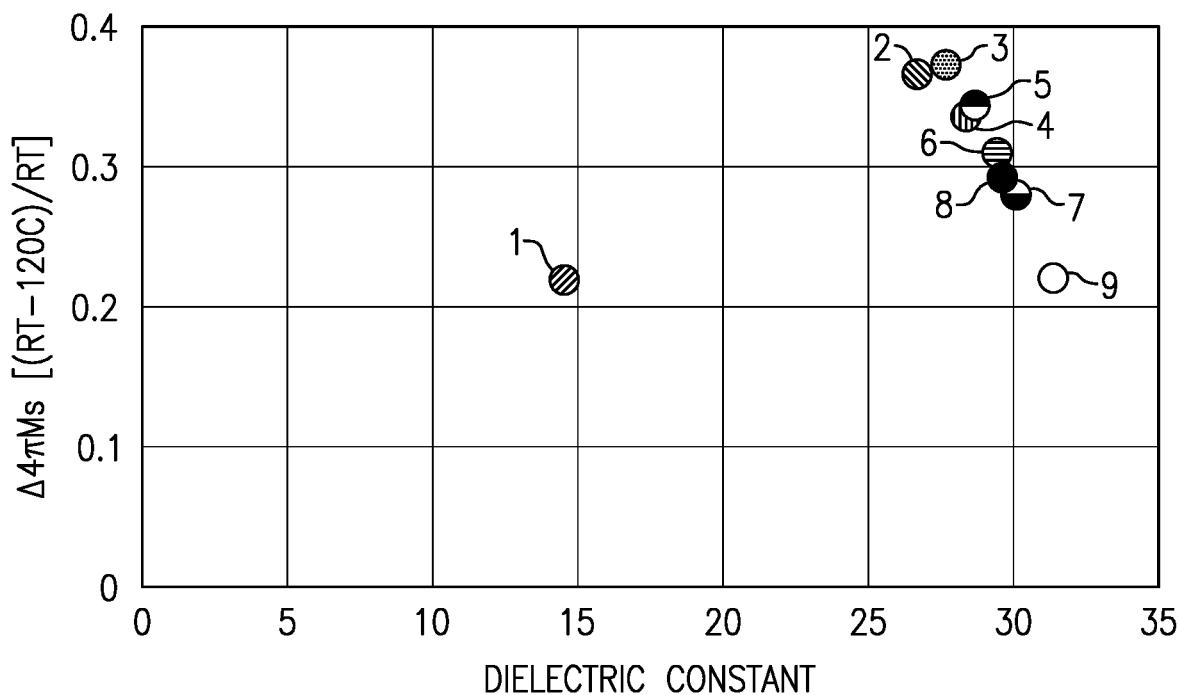
Figure 7C:
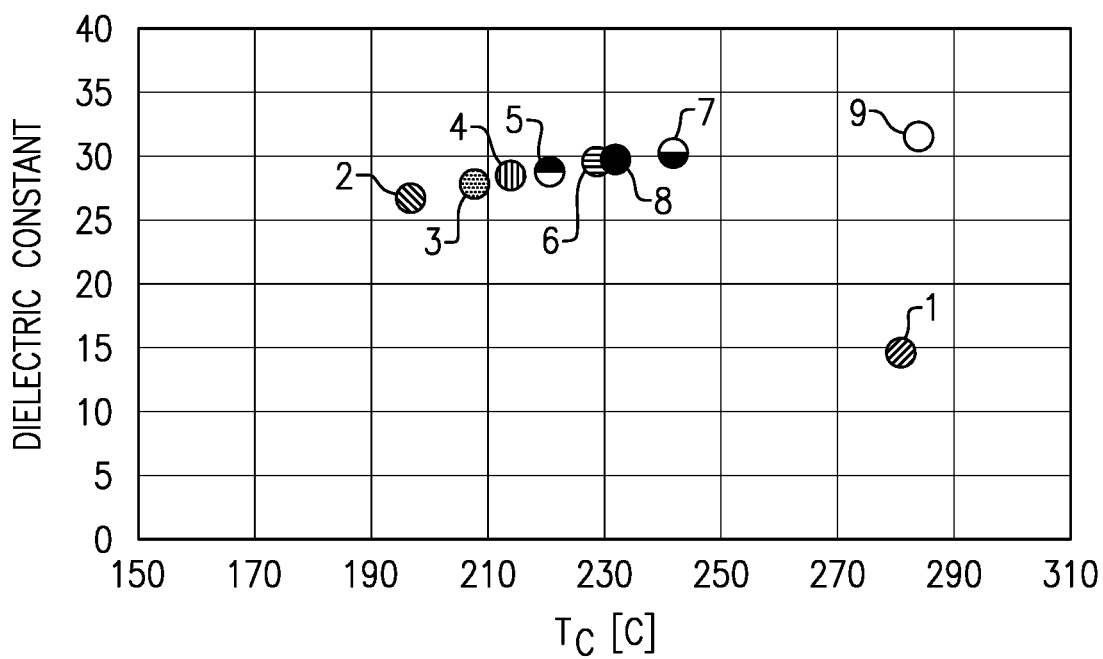

FIGS. 7A-7C are summary graphs of normalized changes in saturation magnetization (Δ4πMs) versus various physical parameters for some ferrites according to embodiments. As illustrated, for samples having a dielectric constant greater than about 28, samples satisfying the compositional criteria of $Bi_{1.0+a}Y_{2.0-a-x-2y}Ca_{x+2y}Fe_{5-x-y}M^{IV}_xV_yO_{12}$, where $M^{IV}$=Zr, Sn or Ti, $0<x\leq0.5$, $0\leq y\leq 0.25$ and $0\leq a\leq 0.5$, have Δ4πMs values that are at or below about 0.35. On the other hand, Samples 1-3 have Δ4πMs values that exceed about 0.35. While not illustrated for brevity, similar observations have been made for ferrites having a chemical formula represented by $Bi_{1.0+a}Y_{2.0-a-2y}Ca_{2y}Fe_{5-y-z}V_y In_zO_{12}$, wherein: $0<z\leq0.5$, $0\leq y\leq 0.25$, and $0\leq a\leq 0.5$.

Figure 8:
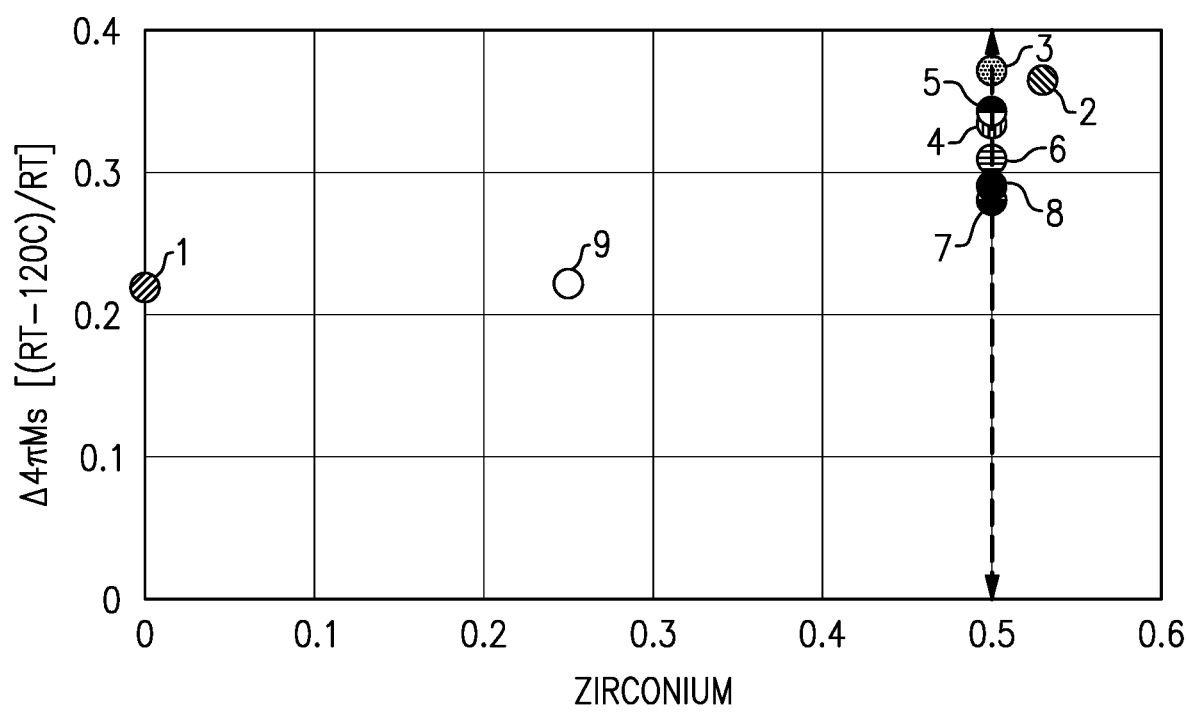
FIG. 8 is a graph of experimental measurements of a normalized change ($\Delta 4\pi Ms$) in saturation magnetization (Ms) of some example ferrites.

FIG. 8 is a summary graph of normalized changes in saturation magnetization (Δ4πMs) versus zirconium content for some ferrites according to embodiments.

Figure 9:
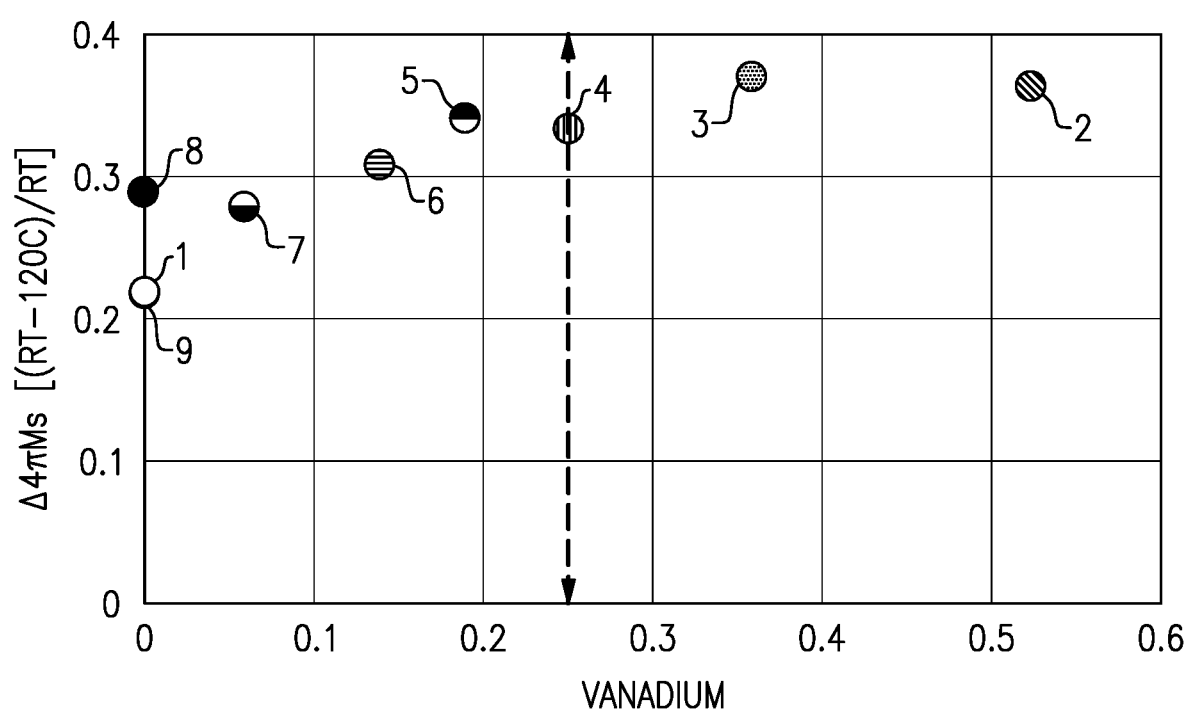
FIG. 9 is a graph of experimental measurements of a normalized change ($\Delta 4\pi Ms$) in saturation magnetization (Ms) of some example ferrites.

FIG. 9 is a summary graph of normalized changes in saturation magnetization (Δ4πMs) versus vanadium content for some ferrites according to embodiments. As illustrated, when V content is higher than about 0.25, the Δ4πMs increases above about 0.35. While not illustrated for brevity, similar V-dependence have been made for ferrites having a chemical formula represented by $Bi_{1.0+a}Y_{2.0-a-2y}Ca_{2y} Fe_{5-y-z}V_yIn_zO_{12}$, wherein: $0<z\leq0.5$, $0\leq y\leq 0.25$, and $0\leq a\leq 0.5$.

Based on the above considerations, the inventors have discovered optimized ranges of various physical properties of the ceramic materials according to embodiments. For example, in accordance with some embodiments, the dielectric constant of the ceramic materials can be greater than 27, 28, 29, 30, or have a value in range defined by any of these values.

At a constant microwave frequency ($\omega=2\pi f$), ferrimagnets exhibit electromagnetic energy absorption that is a function of the internal static magnetic field. Maximum absorption occurs at resonance, or when the precession frequency and direction of the elementary magnetic dipoles equals that of the incident microwave magnetic field. A figure of merit of quality for the ferrites according to embodiments is a parameter referred to herein as 3 a dB linewidth. The 3 dB linewidth of the ferromagnetic resonance is found by sweeping a magnetic field through resonance, and measuring the DC field at the half-power (+3 dB) point using a Gaussmeter. The peak value may be found by differentiating the DC field/power plot digitally and the +3 dB points determined precisely using a polynomial curve fitting. According to various embodiments disclosed herein, the 3 dB linewidth can be minimized, with some embodiments having values below 100, 90, 80, 70, 60, 50, 40, 30, 20, 15, or a value in a range defined by any of these values.

The insertion of bismuth into the garnet structure can cause significant lattice distortion in the garnet structure due to the size of the bismuth being greater than the size of the yttrium it is replacing. Generally, there is only so much bismuth that can be inserted into the garnet structure before the garnet structure decomposes, rendering it less useful for radiofrequency applications. For example, if too much bismuth is added into the garnet structure, the structure will reject the bismuth, and a bismuth rich phase, known as sillenite, may form. When sillenite forms, the 3 dB linewidth of the material can greatly increase, thus making the material difficult for radiofrequency applications.

Sillenite is a structure that is very rich in bismuth and tends to form at the grain boundaries. While the sillenite may not always be detected, as it may form a glass or have poor crystallinity, the 3 dB linewidth usually drastically increases with sillenite. Further, anomalously high dielectric constants lead to the assumption that sillenite is present. In addition, large 3 dB linewidths may be the result of a defect garnet structure that has oxygen or cation vacancies. Thus, the Bi content in the amounts in accordance with the embodiments as described herein can be critical.

The magnetization can limit the operational bandwidth for the isolator or circulator. Various ceramic materials according to embodiments can have an optimized range of saturation magnetization ($M_s$) along with the optimized dielectric constant, which allows them to be used over a specific frequency range. As disclosed herein, embodiments of the synthetic garnet can have a $M_s$ that is greater than 1500, 1550, 1600, 1700, 1800, 1850, 1900, 1950, 2000, 2050, 2100, 2150, 2200 or have a value in a range between any of these values. This allows devices incorporating such materials to be used in higher frequency ranges.

Various ceramic materials according to embodiments can have a relatively high Curie temperature ($T_C$). Curie Temperature represents the maximum temperature above which the ceramic material loses its magnetic interaction. As the operating temperature of a component such as an isolator or circulator approaches the Curie Temperature, the saturation magnetization is reduced. As such, a higher Curie Temperature is associated with a higher operational use temperature for the component without a need for external compensation. As disclosed herein, embodiments of the synthetic garnet can have a Tc of about 150-200° C., 200-250° C., 250-300° C., 300-350° C., or a temperature in a range defined by any of these values.

As discussed above, the inventors have discovered that, in order to achieve the performance goals including, among other things, intermodulation performance and high fractional bandwidths, while maintaining a relatively insertion loss, a relevant figure of merit can be a normalized change in saturation magnetization (Δ4πMs), defined above. According to embodiments, the Δ4πMs can have a value lower than 0.35, 0.30, 0.25, 0.20, 0.15 or a value in a range defined by any of these values.

Another figure of merit associated with the performance goals disclosed herein can be ($\epsilon' \times 4\pi M_s$)/3 dB, where $\epsilon'$ is the dielectric constant, $M_s$ is the saturation magnetization and 3 dB is the 3 dB linewidth described above. The value of ($\epsilon' \times 4\pi M_s$)/3 dB can be in a range defined by any values of $\epsilon'$, $M_s$ and 3 dB disclosed herein, including FIGS. 4A-FIG. 9.

Another figure of merit associated with the performance goals disclosed herein can be $\Delta M_s/\Delta T$, which can represent a linearly approximated slope of Ms vs T curve such as the ones shown in FIG. 6. The value of $\Delta M_s/\Delta T$ can be in a range defined by any values of $M_s$ and T disclosed herein, including FIGS. 4A-FIG. 9.

Figure 10:
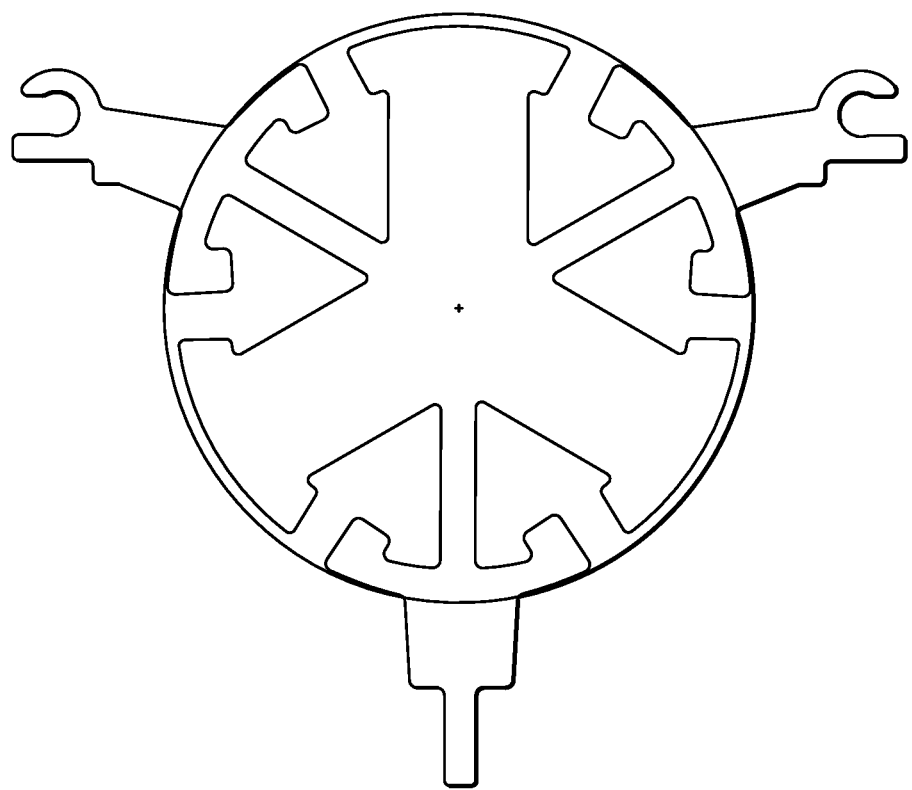
FIG. 10 illustrates a ferrite disc configuration for impedance measurements.

TABLE II summarizes s-parameters (loss parameters including input loss, output loss, insertion loss and isolation loss, all in units of dB) measured at various temperatures for Sample 7 described above (see TABLES IA and IB). The measurements were performed frequencies of 758 MHz and 803 MHz. TABLE III summarizes intermodulation (IMD) measurements (in units of dBc) measured at various temperatures for Samples 8, 4 and 6 described above (see TABLES IA and IB). FIG. 10A illustrates a ferrite disc configuration for the experimental impedance measurements shown in TABLES II and III. The results show good insertion loss and good bandwidth within a historically difficult band of 758-803 MHz.

TABLE II

| Parameter | 1@25 C. | 1@105 C. | 1@-40 C. |
|---|---|---|---|
| S11_Input_Return_Loss(758 MHz) | −23.19 | −30.10 | −24.79 |
| S11_Input_Return_Loss(803 MHz) | −23.49 | −28.76 | −25.46 |
| S22_Output_Return_Loss(758 MHz) | −24.76 | −31.84 | −23.77 |
| S22_Output_Return_Loss(803 MHz) | −23.10 | −29.02 | −24.38 |
| S21_Insertion_Loss(758 MHz) | −0.21 | −0.20 | −0.19 |
| S21_Insertion_Loss(803 MHz) | −0.23 | −0.23 | −0.21 |
| S12_Isolation(758 MHz) | −31.27 | −22.36 | −21.81 |
| S12_Isolation(803 MHz) | −19.64 | −18.18 | −15.42 |

TABLE III

| Parameter | Sample 6 @25 C. | Sample 4 @25 C. | 1931@25 C. |
|---|---|---|---|
| F1_758M_F2_763M_P_46_1_2tone_IM2F2F1 | 80.61 | 101.78 | 81.02 |
| F1_758M_F2_763M_P_46_1_2tone_IM2F1F2 | 79.29 | 87.74 | 82.70 |
| F1_778M_F2_783M_P_46_1_2tone_IM2F2F1 | 78.06 | 87.17 | 81.95 |
| F1_778M_F2_783M_P_46_1_2tone_IM2F1F2 | 87.30 | 90.62 | 91.82 |
| F1_798M_F2_803M_P_46_1_2tone_IM2F2F1 | 76.63 | 90.90 | 82.79 |
| F1_798M_F2_803M_P_46_1_2tone_IM2F1F2 | 79.68 | 90.05 | 89.87 |

| Parameter | Sample 6 @25 C. | Sample 6 @105 C. | Sample 6 @−40 C. |
|---|---|---|---|
| F1_758M_F2_763M_P_46_1_2tone_IM2F2F1 | 80.30 | 76.61 | 86.05 |
| F1_758M_F2_763M_P_46_1_2tone_IM2F1F2 | 79.18 | 76.52 | 89.74 |
| F1_778M_F2_783M_P_46_1_2tone_IM2F2F1 | 78.05 | 81.49 | 78.03 |
| F1_778M_F2_783M_P_46_1_2tone_IM2F1F2 | 85.57 | 84.79 | 82.90 |
| F1_798M_F2_803M_P_46_1_2tone_IM2F2F1 | 77.67 | 85.95 | 80.47 |
| F1_798M_F2_803M_P_46_1_2tone_IM2F1F2 | 77.93 | 85.98 | 80.48 |

| Parameter | Sample 8 @25 C. | Sample 8 @105 C. |
|---|---|---|
| F1_758M_F2_763M_P_46_1_2tone_IM2F2F1 | 79.10 | 88.46 |
| F1_758M_F2_763M_P_46_1_2tone_IM2F1F2 | 79.01 | 78.69 |
| F1_778M_F2_783M_P_46_1_2tone_IM2F2F1 | 76.85 | 81.25 |
| F1_778M_F2_783M_P_46_1_2tone_IM2F1F2 | 97.80 | 71.13 |
| F1_798M_F2_803M_P_46_1_2tone_IM2F2F1 | 78.06 | 72.02 |
| F1_798M_F2_803M_P_46_1_2tone_IM2F1F2 | 83.02 | 67.92 |

Preparation of the Modified Synthetic Garnet Compositions:

The preparation of the modified synthetic garnet materials can be accomplished by using known ceramic techniques. A particular example of the process flow is illustrated in FIG. 11.

Figure 11:
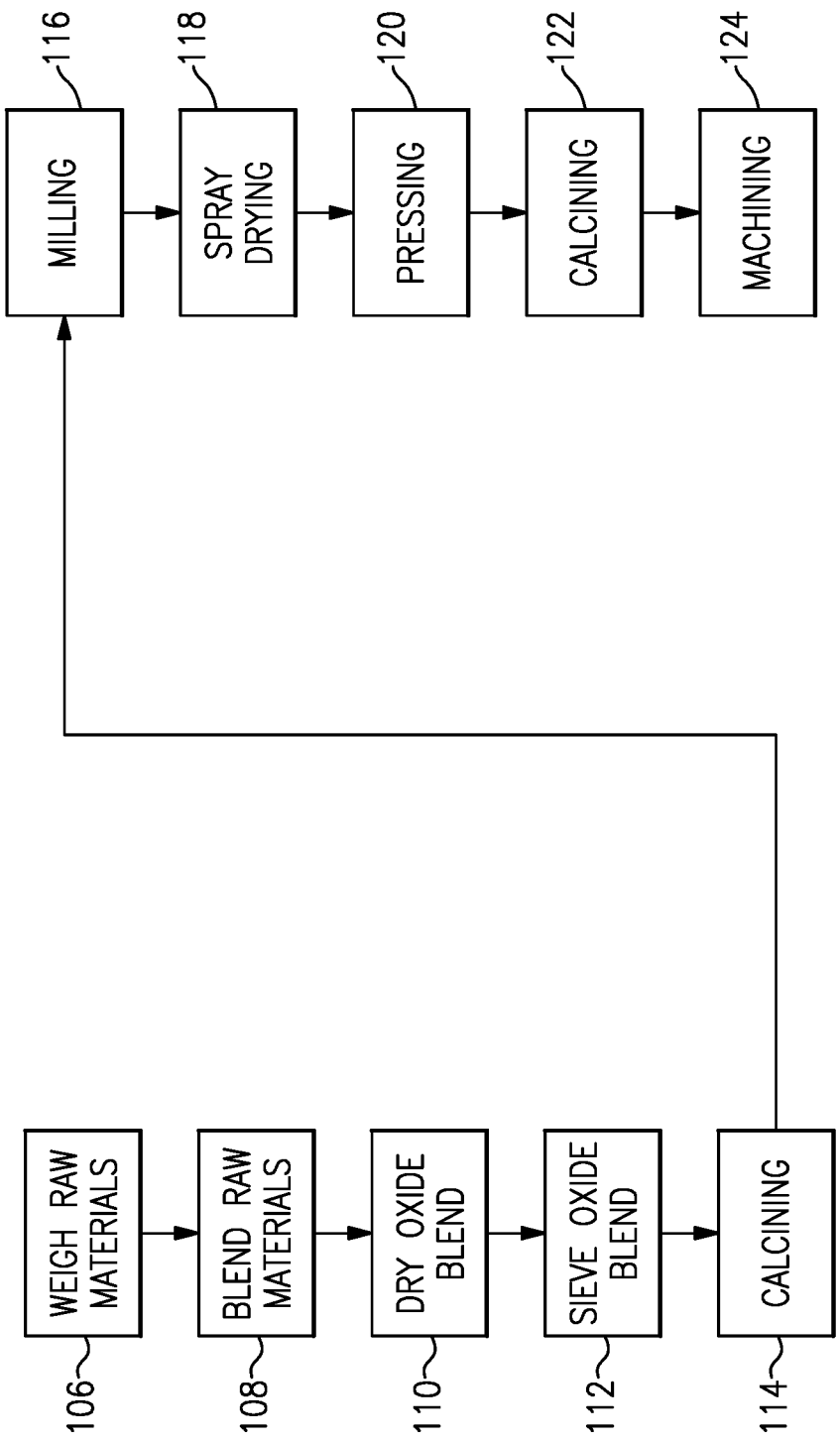
FIG. 11 illustrates an example process flow for making an embodiment of a modified synthetic garnet having one or more features described herein.

As shown in FIG. 11, the process begins with step 106 for weighing the raw material. The raw material may include oxides and carbonates such as, for example, iron oxide (e.g., $Fe_2O_3$), bismuth oxide (e.g., $Bi_2O_3$), yttrium oxide (e.g., $Y_2O_3$), calcium carbonate (e.g., $CaCO_3$), zirconium oxide (e.g., $ZrO_2$), tin oxide (e.g., $SnO_2$), titanium oxide (e.g., $TiO_2$), indium oxide ($In_2O_3$), vanadium pentoxide (e.g., $V_2O_5$), yttrium vanadate (e.g., $YVO_4$), or combinations thereof. In addition, organic based materials may be used in a sol gel process for ethoxides and/or acrylates or citrate based techniques may be employed. Other known methods in the art such as co-precipitation of hydroxides, sol-gel, or laser ablation may also be employed as a method to obtain the materials. The amount and selection of raw material depend on the specific formulation.

After the raw materials are weighed, they are blended in Step 108 using methods consistent with the current state of the ceramic art, which can include aqueous blending using a mixing propeller, or aqueous blending using a vibratory mill with steel or zirconia media. In some embodiments, a glycine nitrate or spray pyrolysis technique may be used for blending and simultaneously reacting the raw materials.

The blended oxide is subsequently dried in Step 110, which can be accomplished by pouring the slurry into a pane and drying in an oven, preferably between 100-400° C. or by spray drying, or by other techniques known in the art.

The dried oxide blend is processed through a sieve in Step 112, which homogenizes the powder and breaks up soft agglomerates that may lead to dense particles after calcining.

The material is subsequently processed through a pre-sintering calcining in Step 114. Preferably, the material is loaded into a container such as an alumina or cordierite sagger and heat treated in the range of about 800-1000° C. In some embodiments, a heat treatment in the range of about 500-1000° C. can be used. In some embodiments, a heat treatment in the range of about 900-950° C. can be used. In some embodiments, a heat treatment in the range of about 500-700° C. can be used. Preferably, the firing temperature is low as higher firing temperatures have an adverse effect on linewidth.

After calcining, the material is milled in Step 116, preferably in a vibratory mill, an attrition mill, a jet mill or other standard comminution technique to reduce the median particle size into the range of about 0.01 to 0.1 microns, though in some embodiments larger sizes such as 0.5 micron to 10 microns can be used as well. Milling is preferably done in a water based slurry but may also be done in ethyl alcohol or another organic based solvent.

The material is subsequently spray dried in Step 118. During the spray drying process, organic additives such as binders and plasticizers can be added to the slurry using techniques known in the art. The material is spray dried to provide granules amenable to pressing, preferably in the range of about 10 microns to 150 microns in size.

The spray dried granules are subsequently pressed in Step 120, preferably by uniaxial or isostatic pressing to achieve a pressed density to as close to 60% of the x-ray theoretical density as possible. In addition, other known methods such as tape casting, tape calendaring or extrusion may be employed as well to form the unfired body.

The pressed material is subsequently processed through a calcining process in Step 122. Preferably, the pressed material is placed on a setter plate made of material such as alumina which does not readily react with the garnet material. The setter plate is heated in a periodic kiln or a tunnel kiln in air or pressure oxygen in the range of between about 850° C.-1000° C. to obtain a dense ceramic compact. In some embodiments, a heat treatment in the range of about 500-1000° C. can be used. In some embodiments, a heat treatment in the range of about 500-700° C. can be used. Other known treatment techniques, such as induction heat, hot pressing, fast firing, or assisted fast firing, may also be used in this step. In some embodiments, a density having >98% of the theoretical density can be achieved.

The dense ceramic compact is machined in the Step 124 to achieve dimensions suitable or the particular applications.

Devices Incorporating Ultra High Dielectric Constant Garnet

Radio-frequency (RF) applications that utilize synthetic garnet compositions, such as those disclosed above, can include ferrite devices having relatively low magnetic resonance linewidths. RF applications can also include devices, methods, and/or systems having or related to garnet compositions having reduced or substantially nil reduced earth content. As described herein, such garnet compositions can be configured to yield relatively high dielectric constants; and such a feature can be utilized to provide advantageous functionalities. It will be understood that at least some of the compositions, devices, and methods described in reference above can be applied to such implementations.

Figure 12:
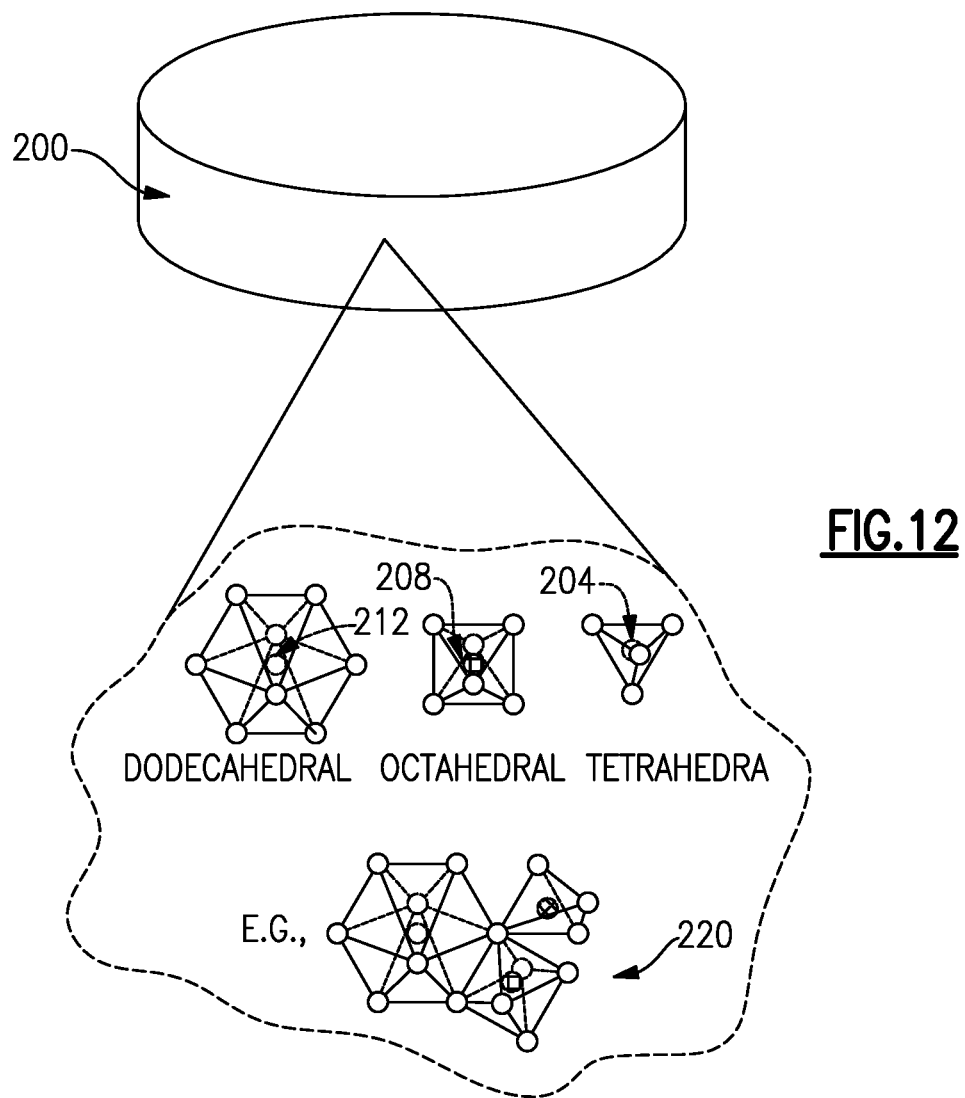
FIG. 12 shows an example ferrite device having one or more garnet features as described herein.

FIG. 12 shows a radio-frequency (RF) device 200 having garnet structure and chemistry such as disclosed herein, and thus a plurality of dodecahedral structures, octahedral structures, and tetrahedral structures. The device 200 can include garnet structures (e.g., a garnet structure 220) formed from such dodecahedral, octahedral, and tetrahedral structures. Disclosed herein are various examples of how dodecahedral sites 212, octahedral sites 208, and tetrahedral sites 204 can be filled by or substituted with different ions to yield one or more desirable properties for the RF device 200. Such properties can include, but are not limited to desirable RF properties and cost-effectiveness of manufacturing of ceramic materials that can be utilized to fabricate the RF device 200. By way of an example, disclosed herein are ceramic materials having relatively high dielectric constants, and having reduced or substantially nil rare earth contents.

Some design considerations for achieving such features are now described. Also described are example devices and related RF performance comparisons. Also described are example applications of such devices, as well as fabrication examples.

Examples of Devices Having Bi-Containing Garnets

As described herein, garnets having Bi can have desirable properties for use in devices for applications such as RF applications. In some implementations, such devices can be configured to take advantage of unique properties of the $Bi^{+3}$ ion. For example, the "lone pair" of electrons on the $Bi^{+3}$ ion can raise the ionic polarizability and hence the dielectric constant.

Further, because the center frequency of a ferrite device (such as a garnet disk) operating in a split polarization transverse magnetic (TM) mode is proportional to $1/(\epsilon)^{1/2}$, doubling the dielectric constant ($\epsilon$) can reduce the frequency by a factor of square root of 2 (approximately 1.414). As described herein in greater detail, increasing the dielectric constant by, for example, a factor of 2, can result in a reduction in a lateral dimension (e.g., diameter) of a ferrite disk by factor of square root of 2. Accordingly, the ferrite disk's area can be reduced by a factor of 2. Such a reduction in size can be advantageous since the device's footprint area on an RF circuit board can be reduced (e.g., by a factor of 2 when the dielectric constant is increased by a factor of 2). Although described in the context of the example increase by a factor of 2, similar advantages can be realized in configurations involving factors that are more or less than 2.

Reduced Size Circulators/Isolators Having Ferrite with High Dielectric Constant As described herein, ferrite devices having garnets with reduced or no rare earth content can be configured to include a high dielectric constant property. Various design considerations concerning dielectric constants as applied to RF applications are now described. In some implementations, such designs utilizing garnets with high dielectric constants may or may not necessarily involve rare earth free configurations.

Values of dielectric constant for microwave ferrite garnets and spinels commonly fall in a range of 12 to 18 for dense polycrystalline ceramic materials. Such garnets are typically used for above ferromagnetic resonance applications in, for example, UHF and low microwave region, because of their low resonance linewidth. Such spinels are typically used at, for example, medium to high microwave frequencies, for below resonance applications, because of their higher magnetization. Most, if not substantially all, circulators or isolators that use such ferrite devices are designed with triplate/ stripline or waveguide structures.

Dielectric constant values for low linewidth garnets are typically in a range of 14 to 16. These materials can be based on yttrium iron garnet (YIG) with a value of approximately 16, or substituted versions of that chemistry with aluminum or, for example, zirconium/vanadium combinations which can reduce the value to around 14. Although for example lithium-titanium based spinel ferrites exist with dielectric constants up to close to 20, these generally do not have narrow linewidths; and thus are not suitable for many RF applications. However, as described in detail above, garnets made using bismuth substituted for yttrium can have much higher dielectric constants.

In some embodiments, an increase in dielectric constant can be maintained for compositions containing bismuth, including those with other non-magnetic substitution on either or both of the octahedral and tetrahedral sites (e.g., zirconium or vanadium, respectively). By using ions of higher polarization, it is possible to further increase the dielectric constant. For example, titanium can be substituted into the octahedral or tetrahedral site; and titanium can potentially enter both sites.

In some embodiments, a relationship between ferrite device size, dielectric constant, and operating frequency can be represented as follows. There are different equations that can characterize different transmission line representations. For example, in above-resonance stripline configurations, the radius R of a ferrite disk can be characterized as $$R=1.84/[2\pi(\text{effective permeability})\times(\text{dielectric constant})]^{1/2} \quad (1)$$

where (effective permeability)=$H_{dc}+4\pi M_s/H_{dc}$, with $H_{dc}$ being the magnetic field bias. Equation 1 shows that, for a fixed frequency and magnetic bias, the radius R is inversely proportional to the square root of the dielectric constant.

In another example, in below-resonance stripline configurations, a relationship for ferrite disk radius R similar to Equation 1 can be utilized for weakly coupled quarter wave circulators where the low bias field corresponds to below-resonance operation. For below-resonance waveguide configurations (e.g., in disk or rod waveguides), both lateral dimension (e.g., radius R) and thickness d of the ferrite can influence the frequency. However, the radius R can still be expressed as $$R=\lambda/[2\pi(\text{dielectric constant})^{1/2}][((\pi R)/(2d))^2 + (1.84)^2]^{1/2} \quad (2)$$

which is similar to Equation 1 in terms of relationship between R and dielectric constant.

The example relationship of Equation 2 is in the context of a circular disk shaped ferrites. For a triangular shaped resonator, the same waveguide expression can used, but in this case, A (altitude of the triangle) being equal to 3.63× $\lambda/2\pi$ applies instead of the radius in the circular disk case.

In all of the foregoing example cases, one can see that by increasing the dielectric constant (e.g., by a factor of 2), one can expect to reduce the size of the ferrite (e.g., circular disk or triangle) by a factor of square root of 2, and thereby reduce the area of the ferrite by a factor of 2. As described in reference to Equation 2, thickness of the ferrite can also be reduced.

In implementations where ferrite devices are used as RF devices, sizes of such RF devices can also be reduced. For example, in a stripline device, a footprint area of the device can be dominated by the area of the ferrite being used. Thus, one can expect that a corresponding reduction in device size would be achieved. In a waveguide device, a diameter of the ferrite being used can be a limiting factor in determining size. However, a reduction provided for the ferrite diameter may be offset by the need to retain wavelength-related dimensions in the metal part of the junction.

Examples of Reduced-Size Ferrite

As described herein, ferrite size can be reduced significantly by increasing the dielectric constant associated with garnet structures. Also as described herein, garnets with reduced Yttrium and/or reduced non-Y rare earth content can be formed by appropriate bismuth substitutions. In some embodiments, such garnets can include Yttrium-free or rare earth free garnets. An example RF device having ferrite devices with increased dielectric constant and Yttrium-free garnets is described in reference to FIGS. 13A-13B.

Figure 13A:
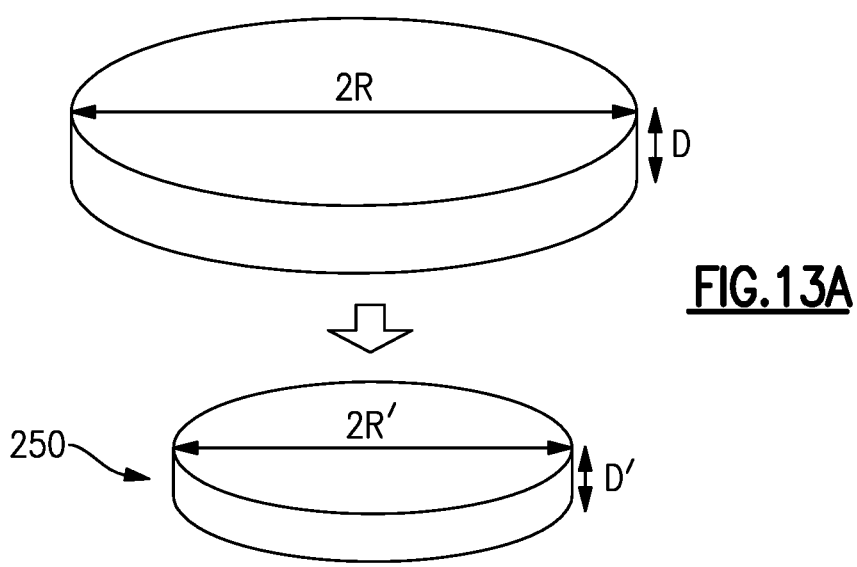
FIGS. 13A and 13B show examples of size reduction that can be implemented for ferrite devices having one or more features as described herein.
Figure 13B:
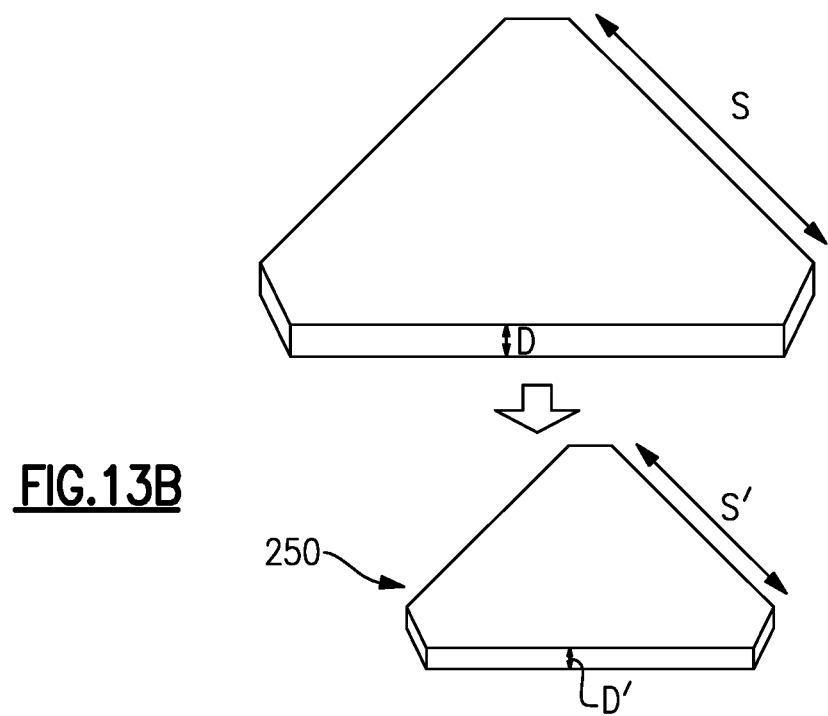

FIGS. 13A and 13B summarize the example ferrite size reductions described herein. As described herein and shown in FIG. 13A, a ferrite device 250 can be a circular-shaped disk having a reduced diameter of 2R' and a thickness of d'. The thickness may or may not be reduced. As described in reference to Equation 1, the radius R of a circular-shaped ferrite disk can be inversely proportional to the square root of the ferrite's dielectric constant. Thus, the increased dielectric constant of the ferrite device 250 is shown to yield its reduced diameter 2R'.

As described herein and shown in FIG. 13B, a ferrite device 250 can also be a triangular-shaped disk having a reduced side dimension of S' and a thickness of d'. The thickness may or may not be reduced. As described in reference to Equation 2, the altitude A of a triangular-shaped ferrite disk (which can be derived from the side dimension S) can be inversely proportional to the square root of the ferrite's dielectric constant. Thus, the increased dielectric constant of the ferrite device 250 is shown to yield its reduced dimension S'.

Although described in the context of example circular and triangle shaped ferrites, one or more features of the present disclosure can also be implemented in other shaped ferrites.

Figure 14A:
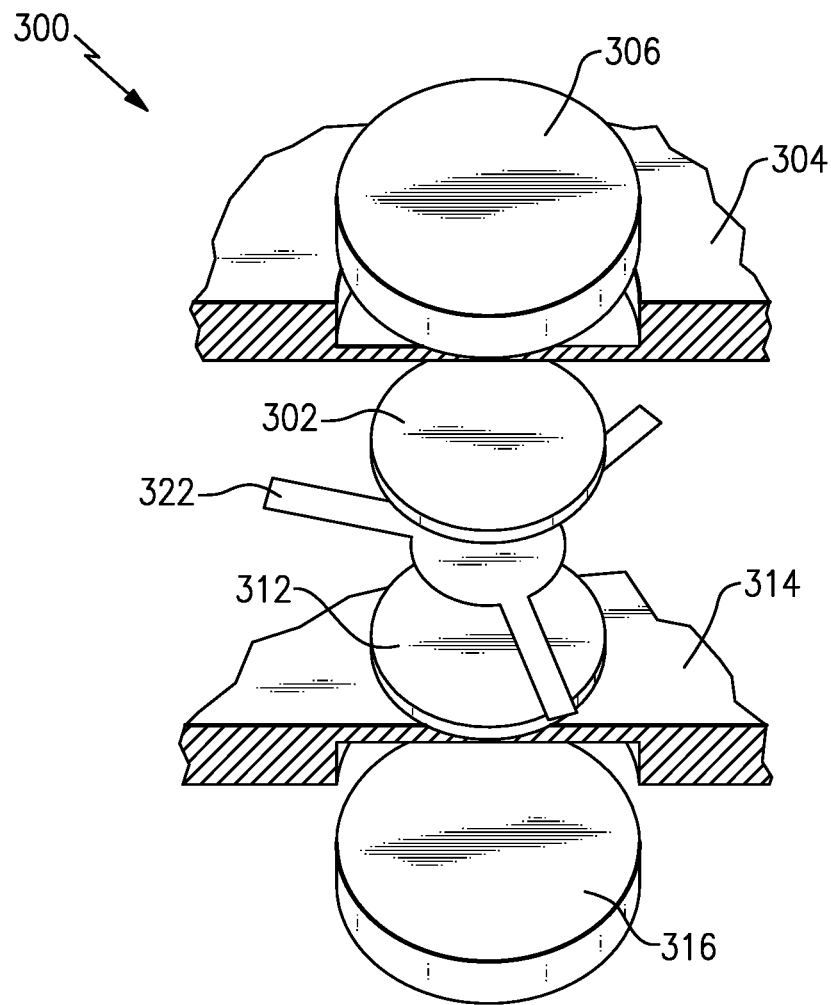
FIGS. 14A and 14B show an example circulator/isolator having ferrite devices as described herein.
Figure 14B:
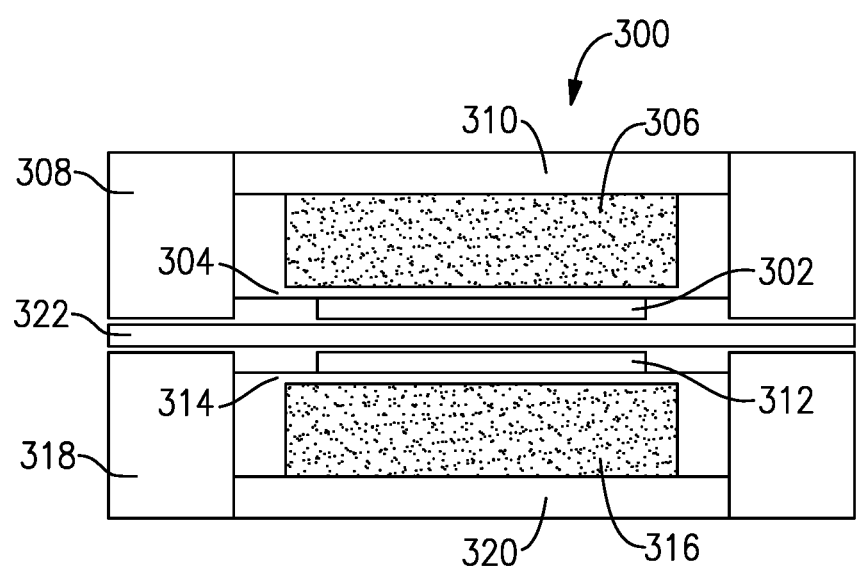

FIGS. 14A and 14B show an example of a circulator 300 having a pair of ferrite disks 302, 312 disposed between a pair of cylindrical magnets 306, 316. Each of the ferrite disks 302, 312 can be a ferrite disk having one or more features described herein. FIG. 14A shows an un-assembled view of a portion of the example circulator 300. FIG. 14B shows a side view of the example circulator 300.

In the example shown, the first ferrite disk 302 is shown to be mounted to an underside of a first ground plane 304. An upper side of the first ground plane 304 is shown to define a recess dimensioned to receive and hold the first magnet 306. Similarly, the second ferrite disk 312 is shown to be mounted to an upper side of a second ground plane 314; and an underside of the second ground plane 314 is shown to define a recess dimensioned to receive and hold the second magnet 316.

The magnets 306, 316 arranged in the foregoing manner can yield generally axial field lines through the ferrite disks 302, 312. The magnetic field flux that passes through the ferrite disks 302, 312 can complete its circuit through return paths provided by 320, 318, 308 and 310 so as to strengthen the field applied to the ferrite disks 302, 312. In some embodiments, the return path portions 320 and 310 can be disks having a diameter larger than that of the magnets 316, 306; and the return path portions 318 and 308 can be hollow cylinders having an inner diameter that generally matches the diameter of the return path disks 320, 310. The foregoing parts of the return path can be formed as a single piece or be an assembly of a plurality of pieces.

The example circulator device 300 can further include an inner flux conductor (also referred to herein as a center conductor) 322 disposed between the two ferrite disks 302, 312. Such an inner conductor can be configured to function as a resonator and matching networks to the ports (not shown).

Various examples of new garnet systems and devices related thereto are described herein. In some embodiments, such garnet systems can contain high levels of bismuth, which can allow formation of low loss ferrite devices. Further, by selected addition of other elements, one can reduce or eliminate rare earth content of garnets, including commercial garnets. Reduction or elimination of such rare earth content can include, but is not limited to, yttrium. In some embodiments, the garnet systems described herein can be configured to significantly increase (e.g., double) the dielectric constant of non-Bi garnets, thereby offering the possibility of significantly decreasing (e.g., halving) the printed circuit "footprint" of ferrite devices associated with conventional garnets.

Figure 15:
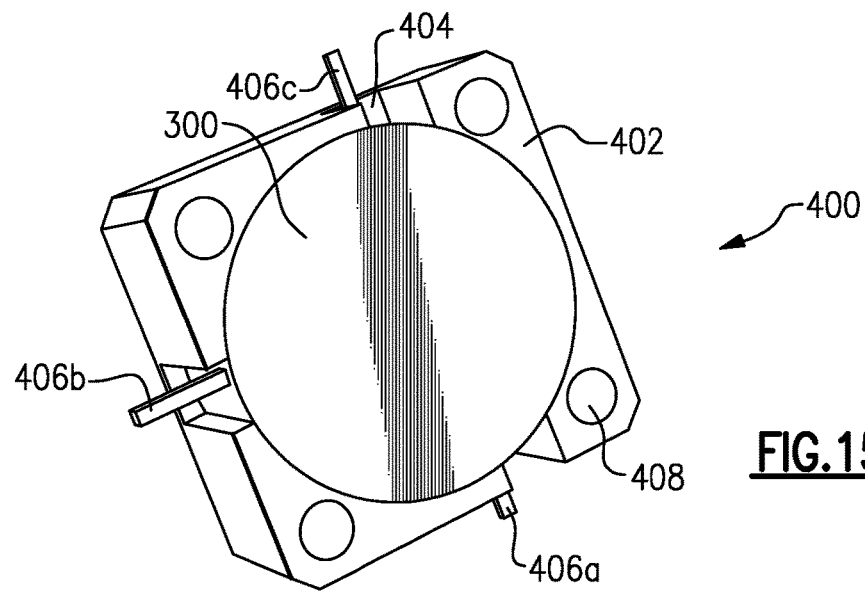
FIG. 15 shows an example of a packaged circulator module.

In some embodiments, ferrite-based circulator devices having one or more features as described herein can be implemented as a packaged modular device. FIG. 15 shows an example packaged device 400 having a circulator device 300 (for example as shown in FIG. 14B) mounted on a packaging platform 404 and enclosed by a housing structure 402. The example platform 404 is depicted as including a plurality of holes 408 dimensioned to allow mounting of the packaged device 400. The example packaged device 400 is shown further include example terminals 406a-406c configured to facilitate electrical connections.

Figure 25:
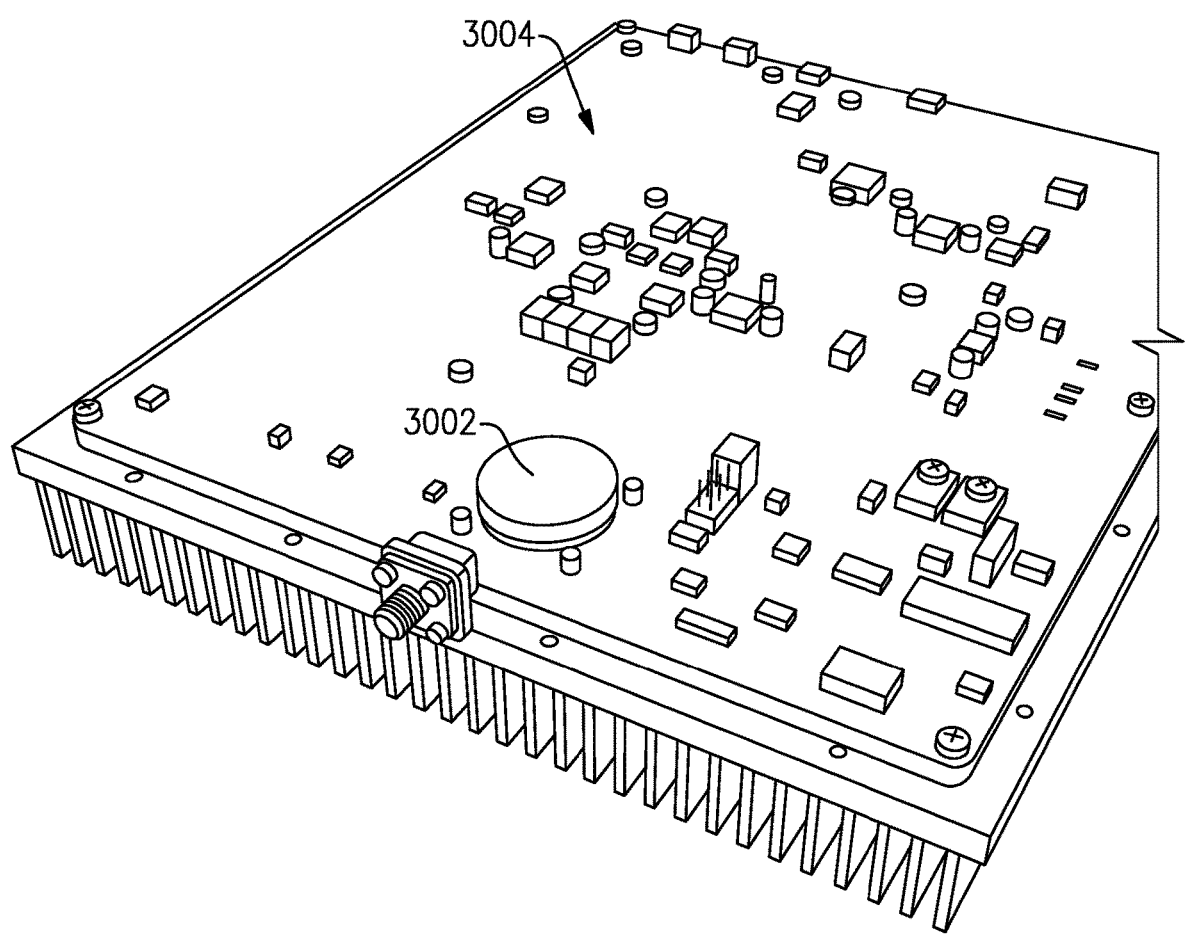
FIG. 25 illustrates an embodiment of a circuit board including embodiments of the material disclosed herein.

In some embodiments, a packaged circulator/isolator 400 such as the example of FIG. 15 can be implemented in a circuit board or module 3004 as shown in FIG. 25. Such a circuit board can include a plurality of circuits configured to perform one or more radio-frequency (RF) related operations. The circuit board can also include a number of connection features configured to allow transfer of RF signals and power between the circuit board and components external to the circuit board.

Figure 16:
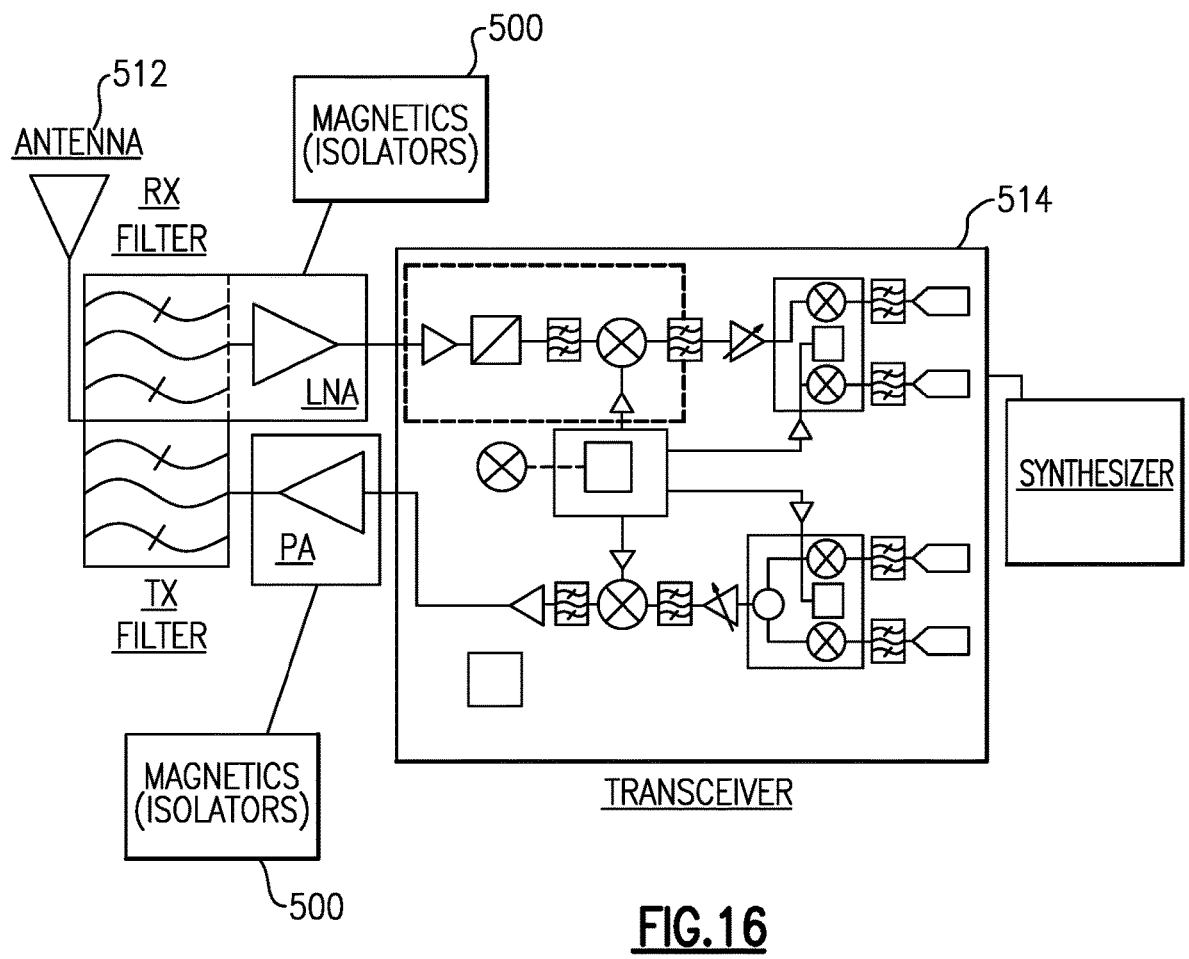
FIG. 16 shows an example RF system where one or more of circulator/isolator devices as described herein can be implemented.

In some embodiments, the foregoing example circuit board can include RF circuits associated with a front-end module of an RF apparatus. As shown in FIG. 16, such an RF apparatus can include an antenna 512 that is configured to facilitate transmission and/or reception of RF signals. Such signals can be generated by and/or processed by a transceiver 514. For transmission, the transceiver 514 can generate a transmit signal that is amplified by a power amplifier (PA) and filtered (Tx Filter) for transmission by the antenna 512. For reception, a signal received from the antenna 512 can be filtered (Rx Filter) and amplified by a low-noise amplifier (LNA) before being passed on to the transceiver 514. In the example context of such Tx and Rx paths, circulators and/or isolators 500 having one or more features as described herein can be implemented at or in connection with, for example, the PA circuit and the LNA circuit.

In some embodiments, circuits and devices having one or more features as described herein can be implemented in RF applications such as a wireless base-station. Such a wireless base-station can include one or more antennas 512, such as the example described in reference to FIG. 16, configured to facilitate transmission and/or reception of RF signals. Such antenna(s) can be coupled to circuits and devices having one or more circulators/isolators as described herein.

As described herein, terms "circulator" and "isolator" can be used interchangeably or separately, depending on applications as generally understood. For example, circulators can be passive devices utilized in RF applications to selectively route RF signals between an antenna, a transmitter, and a receiver. If a signal is being routed between the transmitter and the antenna, the receiver preferably should be isolated. Accordingly, such a circulator is sometimes also referred to as an isolator; and such an isolating performance can represent the performance of the circulator.

Fabrication of RF Devices

Figure 17:
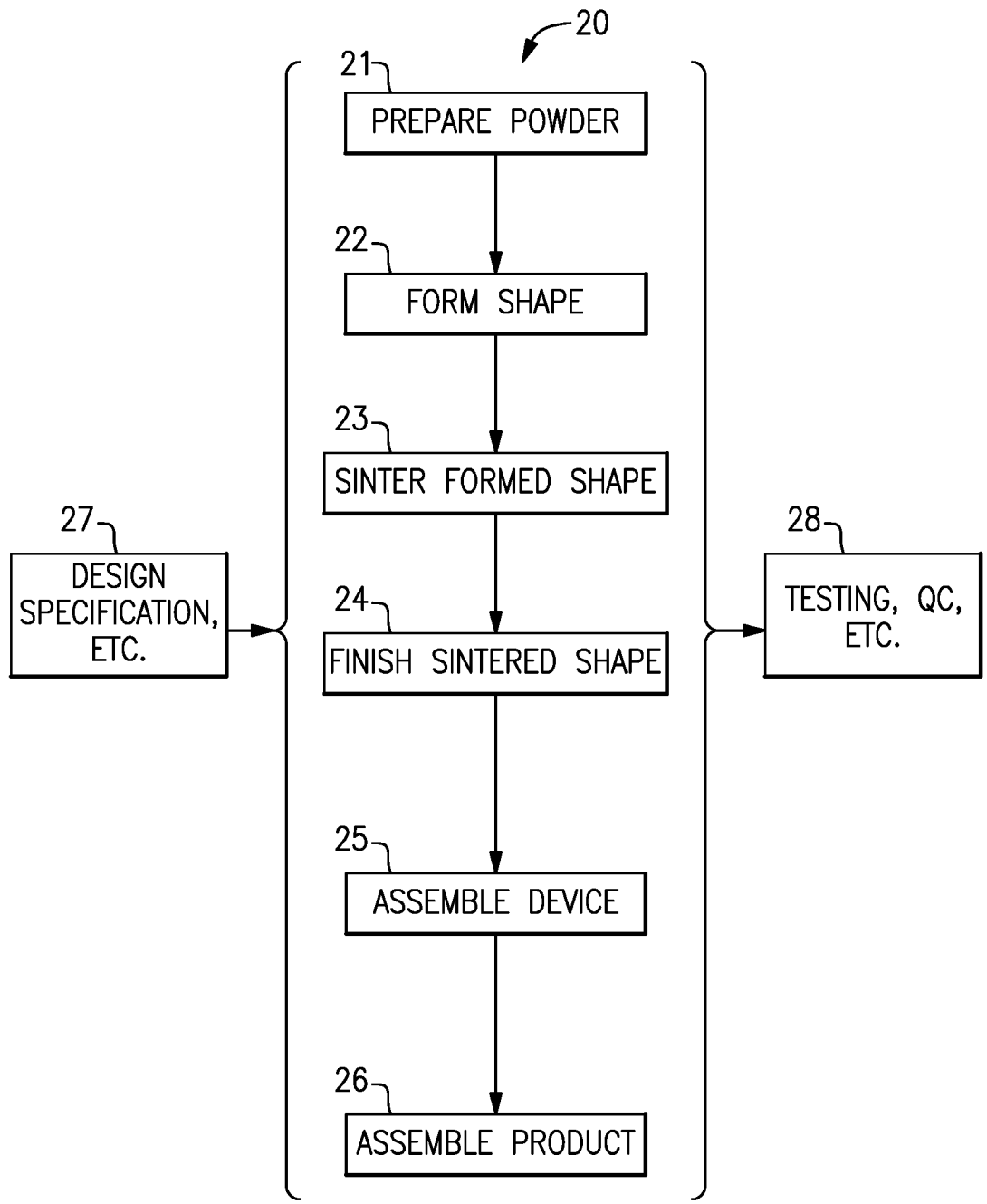
FIG. 17 shows a process that can be implemented to fabricate a ceramic material having one or more features as described herein.

FIGS. 17-21 show examples of how ferrite devices having one or more features as described herein can be fabricated. FIG. 17 shows a process 20 that can be implemented to fabricate a ceramic material having one or more of the foregoing properties. In block 21, powder can be prepared. In block 22, a shaped object can be formed from the prepared powder. In block 23, the formed object can be sintered. In block 24, the sintered object can be finished to yield a finished ceramic object having one or more desirable properties.

In implementations where the finished ceramic object is part of a device, the device can be assembled in block 25. In implementations where the device or the finished ceramic object is part of a product, the product can be assembled in block 26.

FIG. 17 further shows that some or all of the steps of the example process 20 can be based on a design, specification, etc. Similarly, some or all of the steps can include or be subjected to testing, quality control, etc.

In some implementations, the powder preparation step (block 21) of FIG. 17 can be performed by the example process described in reference to FIG. 11. Powder prepared in such a manner can include one or more properties as described herein, and/or facilitate formation of ceramic objects having one or more properties as described herein.

In some implementations, powder prepared as described herein can be formed into different shapes by different forming techniques. By way of examples, FIG. 18 shows a process 50 that can be implemented to press-form a shaped object from a powder material prepared as described herein. In block 52, a shaped die can be filled with a desired amount of the powder. In FIG. 19, configuration 60 shows the shaped die as 61 that defines a volume 62 dimensioned to receive the powder 63 and allow such power to be pressed. In block 53, the powder in the die can be compressed to form a shaped object. Configuration 64 shows the powder in an intermediate compacted form 67 as a piston 65 is pressed (arrow 66) into the volume 62 defined by the die 61. In block 54, pressure can be removed from the die. In block 55, the piston (65) can be removed from the die (61) so as to open the volume (62). Configuration 68 shows the opened volume (62) of the die (61) thereby allowing the formed object 69 to be removed from the die. In block 56, the formed object (69) can be removed from the die (61). In block 57, the formed object can be stored for further processing.

In some implementations, formed objects fabricated as described herein can be sintered to yield desirable physical properties as ceramic devices. FIG. 20 shows a process 70 that can be implemented to sinter such formed objects. In block 71, formed objects can be provided. In block 72, the formed objects can be introduced into a kiln. In FIG. 21, a plurality of formed objects 69 are shown to be loaded into a sintering tray 80. The example tray 80 is shown to define a recess 83 dimensioned to hold the formed objects 69 on a surface 82 so that the upper edge of the tray is higher than the upper portions of the formed objects 69. Such a configuration allows the loaded trays to be stacked during the sintering process. The example tray 80 is further shown to define cutouts 83 at the side walls to allow improved circulation of hot gas at within the recess 83, even when the trays are stacked together. FIG. 21 further shows a stack 84 of a plurality of loaded trays 80. A top cover 85 can be provided so that the objects loaded in the top tray generally experience similar sintering condition as those in lower trays.

In block 73, heat can be applied to the formed objects so as to yield sintered objects. Such application of heat can be achieved by use of a kiln. In block 74, the sintered objects can be removed from the kiln. In FIG. 21, the stack 84 having a plurality of loaded trays is depicted as being introduced into a kiln 87 (stage 86a). Such a stack can be moved through the kiln (stages 86b, 86c) based on a desired time and temperature profile. In stage 86d, the stack 84 is depicted as being removed from the kiln so as to be cooled.

In block 75, the sintered objects can be cooled. Such cooling can be based on a desired time and temperature profile. In block 206, the cooled objects can undergo one or more finishing operations. In block 207, one or more tests can be performed.

Heat treatment of various forms of powder and various forms of shaped objects are described herein as calcining, firing, annealing, and/or sintering. It will be understood that such terms may be used interchangeably in some appropriate situations, in context-specific manners, or some combination thereof.

Telecommunication Base Station

Circuits and devices having one or more features as described herein can be implemented in RF applications such as a wireless base-station. Such a wireless base-station can include one or more antennas configured to facilitate transmission and/or reception of RF signals. Such antenna(s) can be coupled to circuits and devices having one or more circulators/isolators as described herein.

Figure 22:
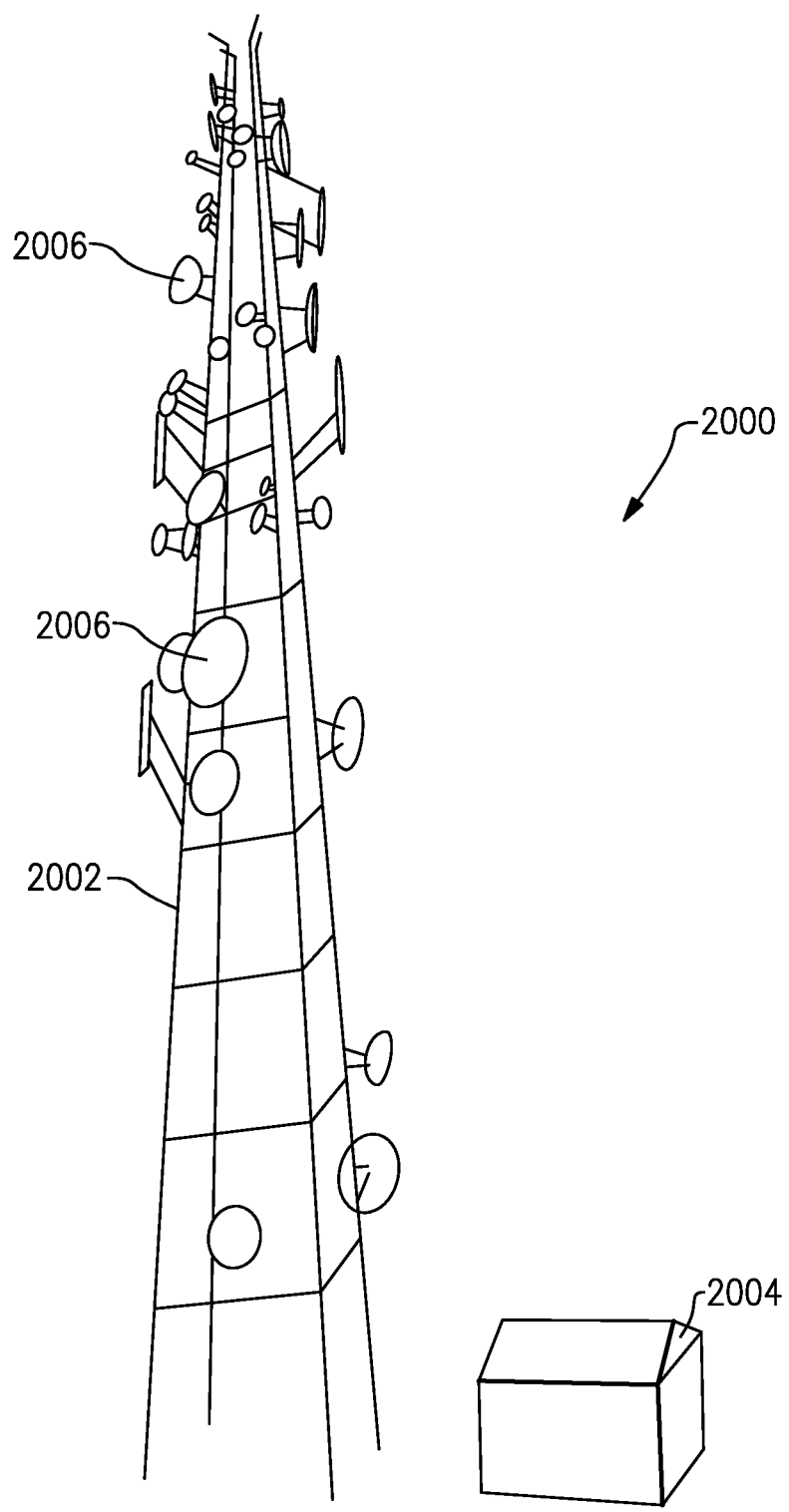
FIG. 22 illustrates a perspective view of a cellular antenna base station incorporating embodiments of the disclosure.

Thus, in some embodiments, the above disclosed material can be incorporated into different components of a telecommunication base station, such as used for cellular networks and wireless communications. An example perspective view of a base station 2000 is shown in FIG. 22, including both a cell tower 2002 and electronics building 2004. The cell tower 2002 can include a number of antennas 2006, typically facing different directions for optimizing service, which can be used to both receive and transmit cellular signals while the electronics building 2004 can hold electronic components such as filters, amplifiers, etc. discussed below. Both the antennas 2006 and electronic components can incorporate embodiments of the disclosed ceramic materials.

Figure 23:
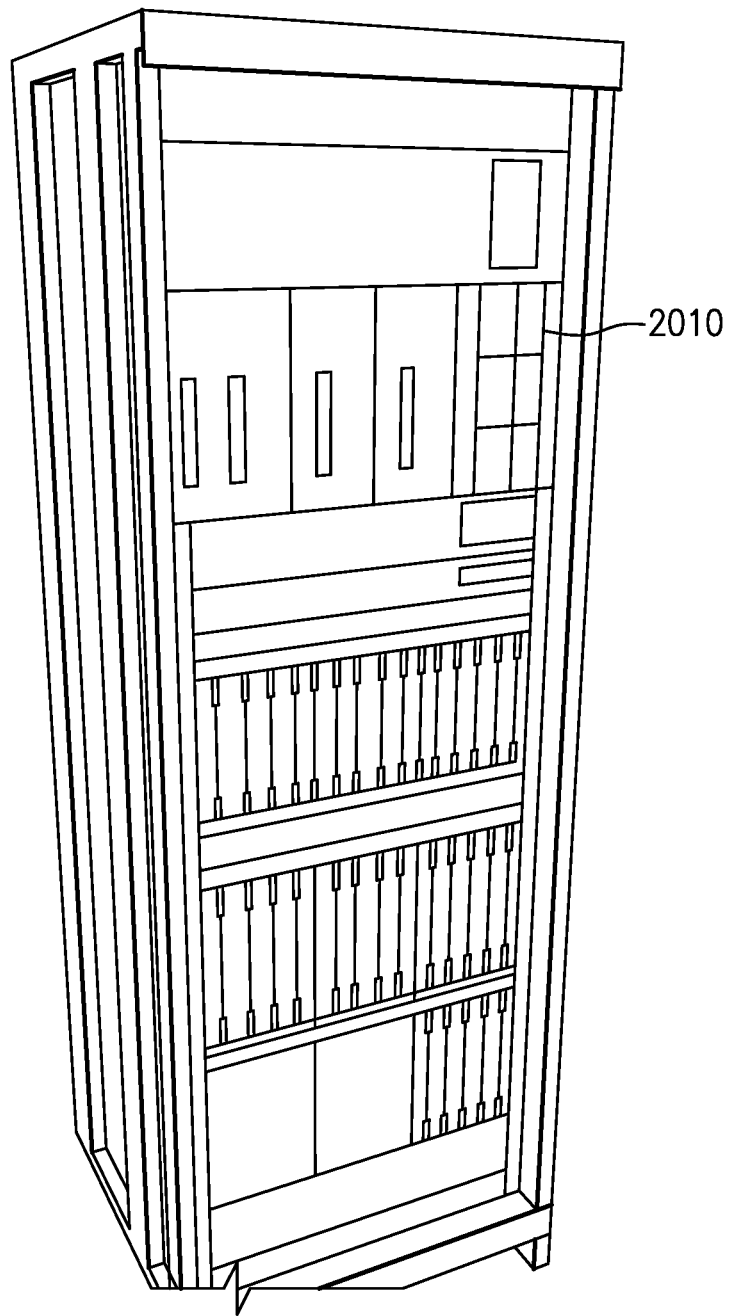
FIG. 23 illustrates housing components of a base station incorporating embodiments of the disclosed material.

FIG. 23 illustrates hardware 2010 that can be used in the electronics building 2004, and can include the components discussed above with respect to FIG. 16. For example, the hardware 2010 can be a base station subsystem (BSS), which can handle traffic and signaling for the mobile systems.

Figure 24:
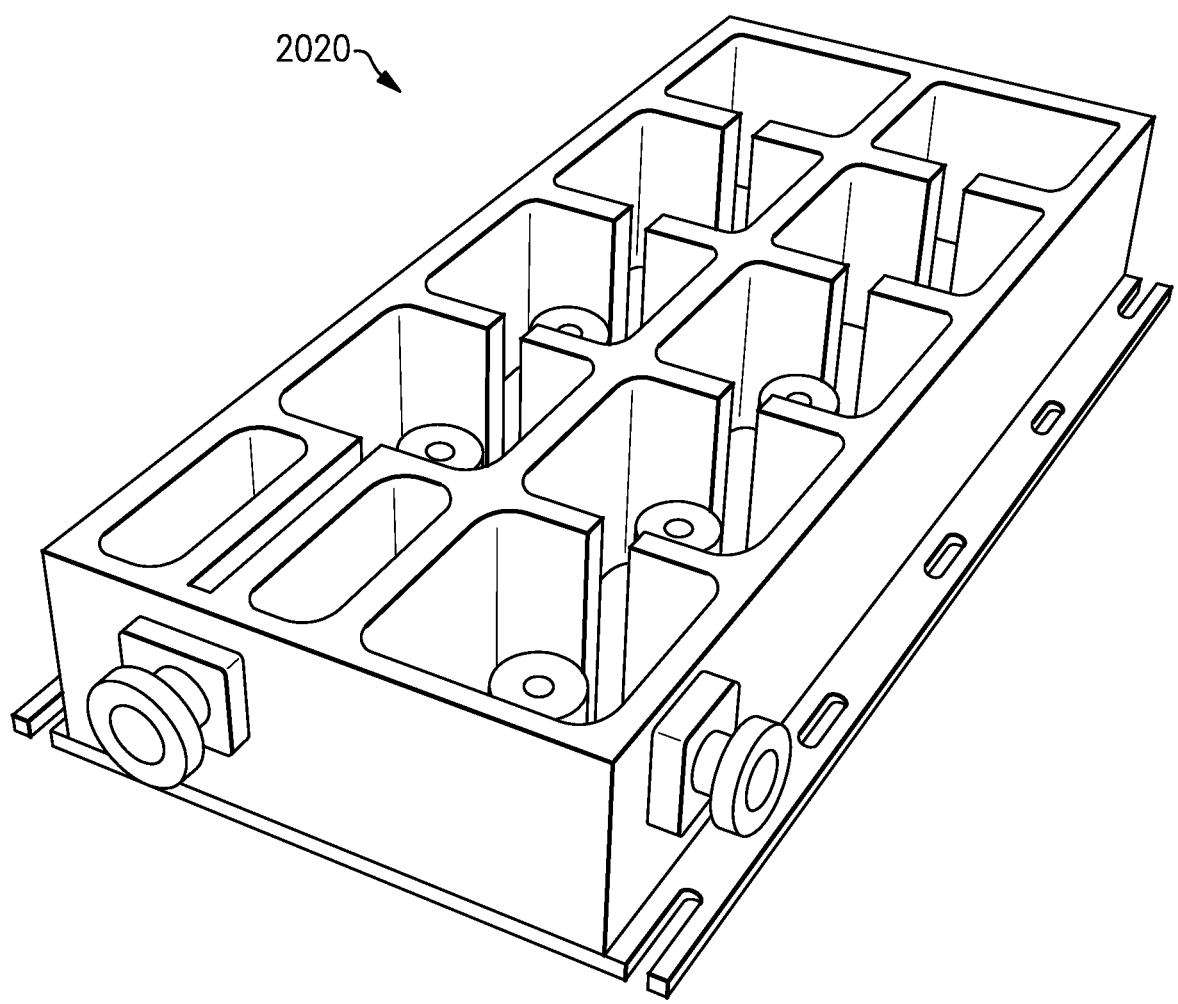
FIG. 24 illustrates a cavity filter used in a base station incorporating embodiments of the material disclosed herein.

FIG. 24 illustrates a further detailing of the hardware 2010 discussed above. Specifically, FIG. 24 depicts a cavity filter/combiner 2020 which can be incorporated into the base station. The cavity filter 2020 can include, for example, bandpass filters such as those incorporating embodiments of the disclosed material, and can allow the output of two or more transmitters on different frequencies to be combined.

FIG. 25 illustrates a circuit board 3004 which can include an isolator/circulator/filter 3002 and can be incorporated into the base station discussed above.

From the foregoing description, it will be appreciated that an inventive garnets and method of manufacturing are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A ceramic article for radio frequency applications, the ceramic article being formed of a ceramic material having a chemical formula represented by:
$Bi_{1.0+a}Y_{2.0-a-x-2y}Ca_{x+2y}Fe_{5-x-y}M^{IV}_xV_yO_{12}$, and $M^{IV}$=Zr, Sn or Ti, $0<x<0.5$, $0\leq y\leq 0.25$, and $0\leq a\leq 0.5$.

2. The ceramic article of claim 1, wherein $0.3\leq a\leq 0.5$.

3. The ceramic article of claim 2, wherein a is about 0.4.

4. The ceramic article of claim 1, wherein $0.3\leq x<0.5$.

5. The ceramic article of claim 1, wherein $y>0$.

6. The ceramic article of claim 5, wherein $0.14\leq y\leq 0.25$.

7. The ceramic article of claim 1, wherein the ceramic material consists essentially of Bi, Y, Ca, Fe, $M^{IV}$, V and O.

8. A ceramic article for radio frequency applications, the ceramic article being formed of a ceramic material having a chemical formula represented by $Bi_{1.0+a}Y_{2.0-a-x-2y}Ca_{x+2y}Fe_{5-x-y}M^{IV}_xV_yO_{12}$, $M^{IV}$ being Zr, Sn or Ti, Sn or Ti, $0<x<0.5$, $0\leq y\leq 0.25$, and $0\leq a\leq 0.5$, and the ceramic material having a composition such that a normalized change ($\Delta 4\pi Ms$) in saturation magnetization (Ms), defined as $\Delta 4\pi Ms=[(4\pi Ms$ at 20° C.$)-(4\pi Ms$ at 120° C.$)]/(4\pi Ms$ at 20° C.$)$, is less than about 0.35.

9. The ceramic article of claim 8, wherein the ceramic material has a dielectric constant greater than 28.

10. The ceramic article of claim 8, wherein the ceramic material has a saturation magnetization of 1550-1850 Gauss.

11. The ceramic article of claim 8, wherein the ceramic material has a dielectric loss tangent less than 0.001.

12. The ceramic article of claim 8, wherein the ceramic material has a 3 dB linewidth of less than 50 Oe.

13. The ceramic article of claim 8, wherein the ceramic material has a Curie Temperature between 200° C. and 300° C.

14. The ceramic article of claim 8, wherein the ceramic article is an isolator or a circulator.

15. The ceramic article of claim 14, wherein the isolator or the circulator is a single piece article having a disc shape without being attached to a dielectric ring.

16. A radio frequency (RF) circulator comprising:
a ceramic disk formed of a ceramic material having a chemical formula represented by $Bi_{1.0+a}Y_{2.0-a-x-2y}Ca_{x+2y}Fe_{5-x-y}M^{IV}_xV_yO_{12}$, $M^{IV}$ being Zr, Sn or Ti, $0<x<0.5$, $0\leq y\leq 0.25$, and $0\leq a\leq 0.5$, and the ceramic material has a composition such that a normalized change ($\Delta 4\pi Ms$) in saturation magnetization (Ms), defined as $\Delta 4\pi Ms=[(4\pi Ms$ at 20° C.$)-(4\pi Ms$ at 120° C.$)]/(4\pi Ms$ at 20° C.$)$, is less than about 0.35.

17. The RF circulator of claim 16, wherein:
$0<x<5$,
$0\leq y\leq 0.25$, and
$0\leq a\leq 0.5$.

18. The RF circulator of claim 16, wherein the circulator is a single piece article having a disc shape without being attached to a dielectric ring.

19. The RF circulator of claim 16, wherein the ceramic material has a dielectric constant greater than 28.

20. The RF circulator of claim 16, wherein the ceramic material has a saturation magnetization of 1550-1850 Gauss.

* * * * *